(12) United States Patent
Tsunekawa et al.

(10) Patent No.: US 11,760,405 B2
(45) Date of Patent: Sep. 19, 2023

(54) HANDLE

(71) Applicant: TOYODA GOSEI CO., LTD., Kiyosu (JP)

(72) Inventors: Yuichi Tsunekawa, Kiyosu (JP); Toshihiko Asai, Kiyosu (JP); Norio Umemura, Kiyosu (JP); Akira Nakiri, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/745,942

(22) Filed: May 17, 2022

(65) Prior Publication Data

US 2022/0371646 A1 Nov. 24, 2022

(30) Foreign Application Priority Data

May 19, 2021 (JP) .................................. 2021-84920

(51) Int. Cl.
*B62D 1/06* (2006.01)
*B62D 1/04* (2006.01)
(52) U.S. Cl.
CPC .................................... *B62D 1/046* (2013.01)
(58) Field of Classification Search
CPC .......... B62D 1/06; B62D 1/065; B62D 1/046; B62D 1/08; B62D 1/10; B62D 1/04; B60Q 1/0082; B60Q 3/283
See application file for complete search history.

(56) References Cited

U.S. PATENT DOCUMENTS 6,164,691 A * 12/2000 Hofer .................... B60R 21/203
74/552

| 2014/0224040 | A1* | 8/2014 | Van'Tzelfde | .......... | B62D 1/046 |
| | | | | | 73/862.381 |
| 2017/0014078 | A1* | 1/2017 | Yamazak | ............. | A61B 5/6893 |
| 2017/0129499 | A1* | 5/2017 | Odate | .................... | B60K 37/06 |
| 2017/0334477 | A1* | 11/2017 | Bossier | ................ | G01D 5/2417 |
| 2020/0053482 | A1 | 2/2020 | Nakano et al. | | |

FOREIGN PATENT DOCUMENTS

| CN | 113954951 A | * | 1/2022 | |
| JP | 2019-117182 A | | 7/2019 | |
| JP | 2019-202446 A | | 11/2019 | |
| WO | WO-0066414 A1 | * | 11/2000 | ............. B29C 41/12 |

OTHER PUBLICATIONS

Machine Translation of WO-0066414-A1.*
Machine Translation of CN-113954951-A.*

* cited by examiner

*Primary Examiner* — Richard W Ridley
*Assistant Examiner* — Brian J McGovern
(74) *Attorney, Agent, or Firm* — POSZ LAW GROUP, PLC

(57) ABSTRACT

A handle in which a sensor layer capable of detecting grip is disposed on a gripping portion that is gripped at a time of steering. The gripping portion includes a core material, a covering layer formed of urethane foam, which is disposed by die-molding so as to cover a periphery of the core material, the sensor layer, and a protective layer covering the sensor layer. The sensor layer is formed of a mold coat agent formed of a urethane-based paint containing a conductive material. The mold coat agent is applied to a die surface of a molding die of the covering layer. At a time of molding the covering layer, the sensor layer formed of the mold coat agent is disposed on a surface side of the covering layer.

2 Claims, 20 Drawing Sheets

HANDLE

The present application claims priority from Japanese Patent Application No. 2021-84920 of Tsunekawa et al, filed on May 19, 2021, the disclosures of which is hereby incorporated into the present application by reference.

BACKGROUND

1. Field of the Invention

The present invention relates to a handle in which a sensor layer capable of detecting grip is provided on a gripping portion that is gripped by a driver at the time of steering.

2. Description of Related Art

In the related art, in this type of handle, a sensor layer that can detect grip due to an increase in capacitance is disposed on a gripping portion to be gripped at the time of steering (JP-A-2019-202446). The sensor layer uses a conductive material. Further, the sensor layer is disposed on a skin material wound around a surface side of the gripping portion of the handle. The skin material is configured of a base material layer such as a non-woven fabric or leather, an elastic body layer laminated on the base material layer, and a coat layer on an outer surface side of the elastic body layer. Then, the elastic body layer contains a conductive material in urethane foam to form the sensor layer.

However, in the handle of the related art, a skin material having the sensor layer is formed by being wound around a surface of a covering layer formed of urethane foam or the like provided around a core material in the gripping portion. That is, in the handle of the related art, it is necessary to apply an adhesive to the covering layer and wrap the skin material around the outer surface of the covering portion having a substantially elliptical cross section of the gripping portion without wrinkles. Therefore, in the handle of the related art, it takes time and effort to manufacture the gripping portion provided with the sensor layer.

Therefore, it is desired that the handle can be easily manufactured even if the handle includes the sensor layer for detecting the grip by the gripping portion.

SUMMARY

A handle according to the present embodiment is provided with a sensor layer capable of detecting grip in a gripping portion to be gripped at a time of steering. The gripping portion includes a core material, a covering layer formed of urethane foam, which is disposed by die-molding so as to cover a periphery of the core material, and a sensor layer. The sensor layer is formed of a mold coat agent formed of a urethane-based paint containing a conductive material, and is disposed on a surface side of the covering layer at a time of molding the covering layer. Further, the sensor layer is covered with a protective layer disposed on a surface side of the gripping portion.

DETAILED DESCRIPTION

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

Figure 1:
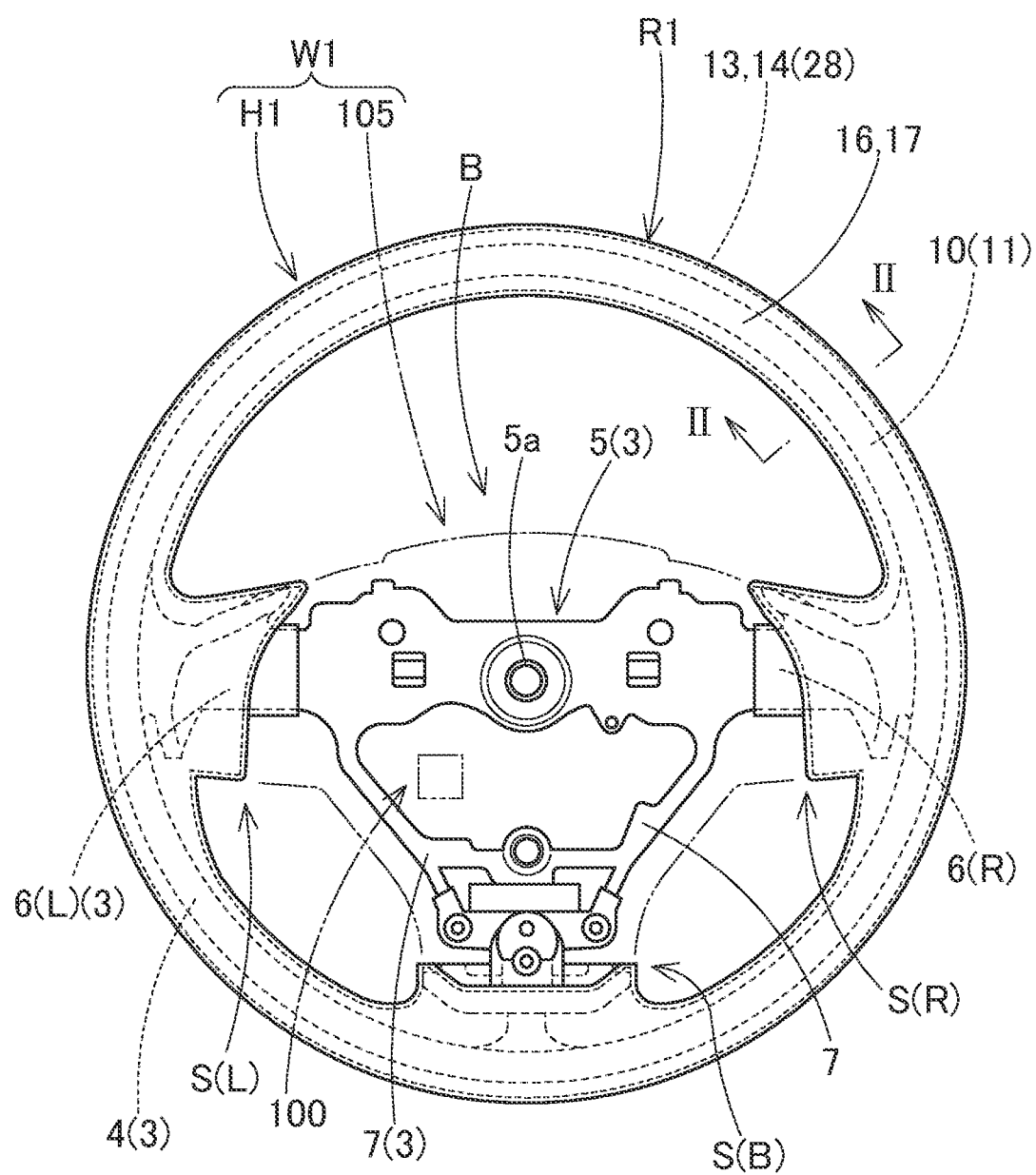
FIG. 1 is a schematic plan view showing a handle according to a first embodiment of the present invention.
Figure 2:
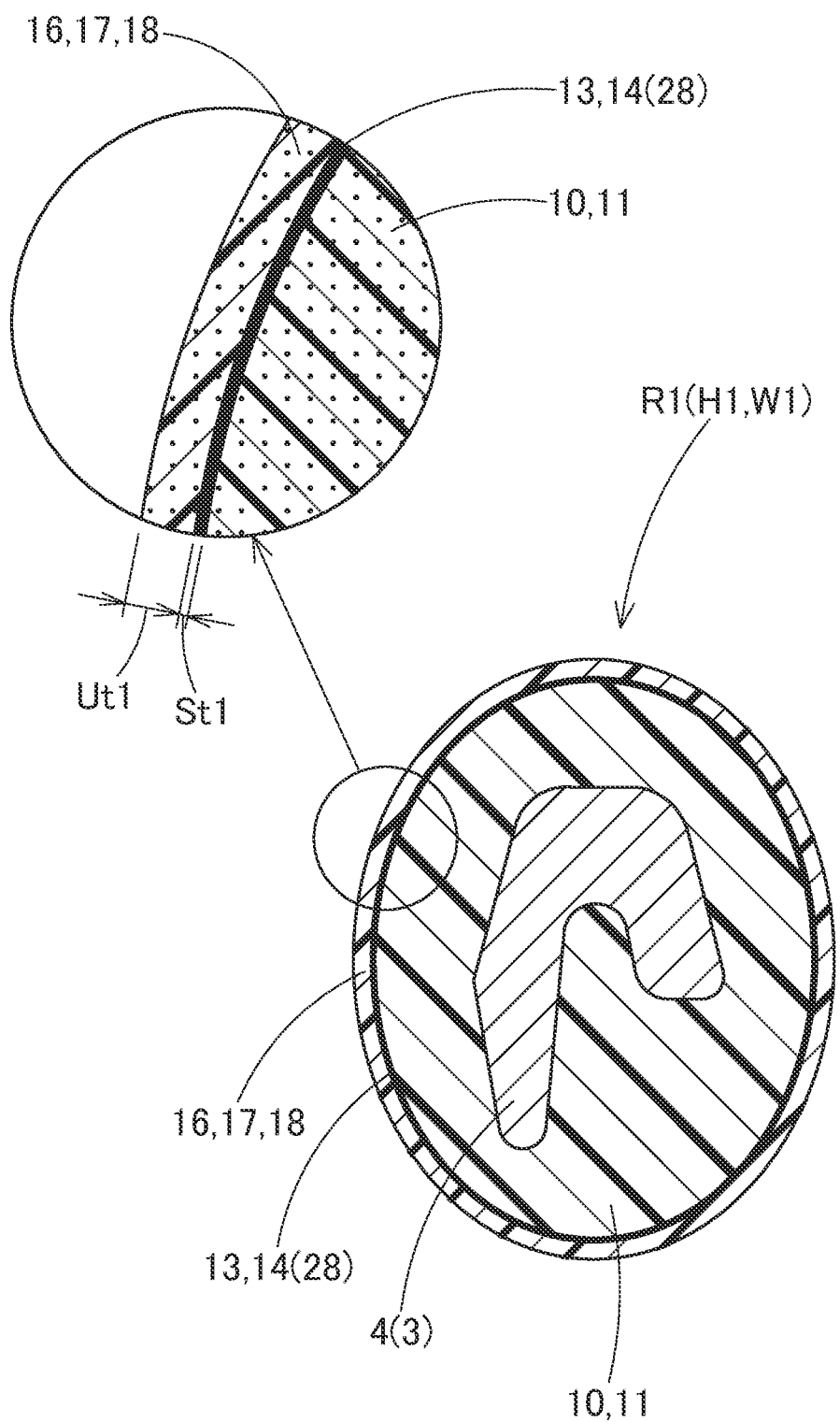
FIG. 2 is a sectional view of a gripping portion of the handle of the first embodiment and corresponds to the II-II portion of FIG. 1.

As shown in FIGS. 1 and 2, a handle W1 of a first embodiment includes a substantially annular gripping portion R1 to be gripped at the time of steering of a vehicle (not shown), a boss portion B at a center of the gripping portion R1, and a spoke portion S (L, R, and B) for connecting the gripping portion R1 and the boss portion B. The spoke portion S includes the spoke portions SL and SR extending from the boss portion B on both left and right sides, and the spoke portion SB extending from the boss portion B on a rear side. Further, the handle W1 includes an airbag device 105 illustrated by a two-dot chain line, which is disposed on an upper side of the boss portion B, a handle main body H1, and a lower cover (not shown) that covers a lower side of the boss portion B.

The handle main body H1 includes a core material 3 formed of a metal material such as an aluminum alloy, which connects the gripping portion R1, the boss portion B, and the spoke portions S. The core material 3 includes a grip core material portion 4 disposed in the gripping portion R, a boss core material portion 5 disposed in the boss portion B, and spoke core material portions 6 (L and R) and 7 disposed in the spoke portions S (L, R, and B). The spoke core material portions 6 (L and R) and 7 connect the grip core material portion 4 and the boss core material portion 5. The boss core material portion 5 includes a steel boss 5a which is coupled to a steering shaft of the vehicle. Further, the spoke core material portions 6L and 6R are disposed on the left and right spoke portions SL and SR. The spoke core material portion 7 is disposed on the spoke portion SB on the rear side. The spoke core material portion 7 is branched to the left and right on a boss core material portion 5 side, and is coupled to a grip core material portion 4 side.

The boss portion B is provided with a grip detection circuit 100 at a portion of the handle main body H1 covered with the airbag device 105. The grip detection circuit 100 is connected to a lead wire (not shown) extending from a sensor layer 13 which is described later. When the hand of the driver approaches the sensor layer 13 so as to grip the gripping portion R1, the capacitance of the sensor layer 13 increases. The grip detection circuit 100 detects an increase in the capacitance and detects the grip of the driver.

Then, as shown in FIG. 2, the gripping portion R1 includes the grip core material portion 4 of the core material 3, a covering layer 10 that covers a periphery of the grip core material portion 4, the sensor layer 13 disposed on a surface of the covering layer 10, and a protective layer 16 disposed on a surface side of the sensor layer 13. The covering layer 10 is formed by the die molding and is formed of urethane foam, as will be described later.

Figure 3:
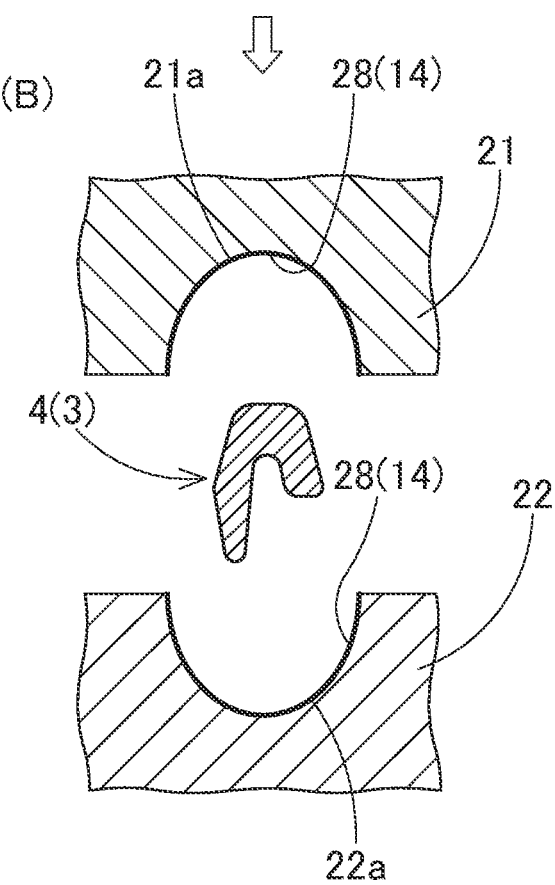
FIG. 3 is a view for explaining a manufacturing process of the handle of the first embodiment.
Figure 3:
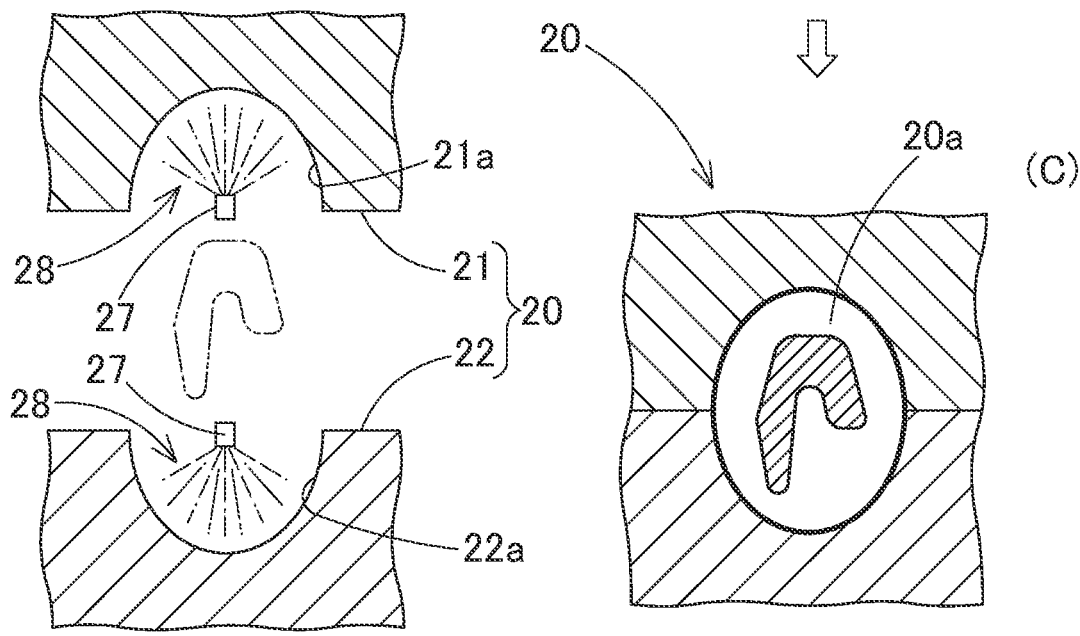

The sensor layer 13 is formed of a mold coat agent 28 formed of a urethane-based paint containing a conductive material (powder such as conductive carbon or metal oxide) (see FIG. 3). The mold coat agent 28 is applied to die surfaces 21a and 22a of the molding die 20 that molds the covering layer 10. Then, at the time of subsequent molding the covering layer 10, the sensor layer 13 formed of the mold coat agent 28 is disposed on the surface side of the covering layer 10.

In the case of the first embodiment, the sensor layer 13 is formed of a urethane-based paint containing conductive carbon.

The protective layer 16 is disposed as a skin layer 17. In the case of the first embodiment, the skin layer 17 is formed of urethane foam and is disposed by the die molding.

In the case of the first embodiment, the urethane foam includes a first urethane layer 11 as the covering layer 10 on the grip core material portion 4 side on the back surface side of the sensor layer 13 and a second urethane layer 18 as the skin layer 17 on the surface side of the sensor layer 13.

In the case of the first embodiment, the sensor layer 13 is formed of a urethane-based paint containing conductive carbon, and the surface of the covering layer 10 is covered with a color of dark black. On the other hand, the skin layer 17 is not black and urethane foam containing a light-colored beige pigment is used in order to enhance the design.

In the case of the first embodiment, a thickness dimension St1 of the sensor layer 13 is set to about 5 to 50 μm, preferably 20 μm in a range of about 10 to 30 μm in consideration of conductivity, durability, and feeling. A thickness dimension Ut1 of the second urethane layer 18 of the skin layer 17 is set to 2 mm within a range of about 1 to 3 mm in consideration of durability, feeling, and sensitivity of the sensor layer 13.

Further, in the first embodiment, in of the first urethane layer 11 and the second urethane layer 18 formed of urethane foam, the density of the second urethane layer 18 is higher than the density of the first urethane layer 11. If the density of the second urethane layer 18 is high, a dielectric constant of the second urethane layer 18 is high, and the sensitivity of grip detection of the sensor layer 13 can be improved. The density of the first urethane layer 11 is set to 0.3 g/cm$^3$ in a range of about 0.2 to 0.4 g/cm$^3$, and the density of the second urethane layer 18 is set to 0.7 g/cm$^3$ within a range about 0.5 to 0.9 g/cm$^3$.

The manufacturing process of the handle main body H1 of the first embodiment includes a mold coat agent application process, a first urethane layer molding process, and a second urethane layer molding process.

First, in the mold coat agent applying process, as shown in (A) and (B) of FIG. 3, a molding die 20 for molding the first urethane layer 11 as the covering layer 10 is used. The molding die 20 includes split dies 21 and 22. Then, the mold coat agent 28 forming the sensor layer 13 is applied to die surfaces 21a and 22a of the split dies 21 and 22 by a spray gun 27 as an applying device. Before applying the mold coat agent 28, a mold releasing agent is applied to the die surfaces 21a and 22a.

Then, as the first urethane layer molding process, as shown in (C) and (D) of FIG. 3, the molding die 20 configured of the split dies 21 and 22 is tightened, and the urethane material for molding the first urethane layer 11 is injected into the cavity 20a. After that, if the injected urethane material is cured, an intermediate molded product 15 in which the first urethane layer 11 is molded can be manufactured. The manufactured intermediate molded product 15 is taken out by opening the molding die 20.

Figure 4:
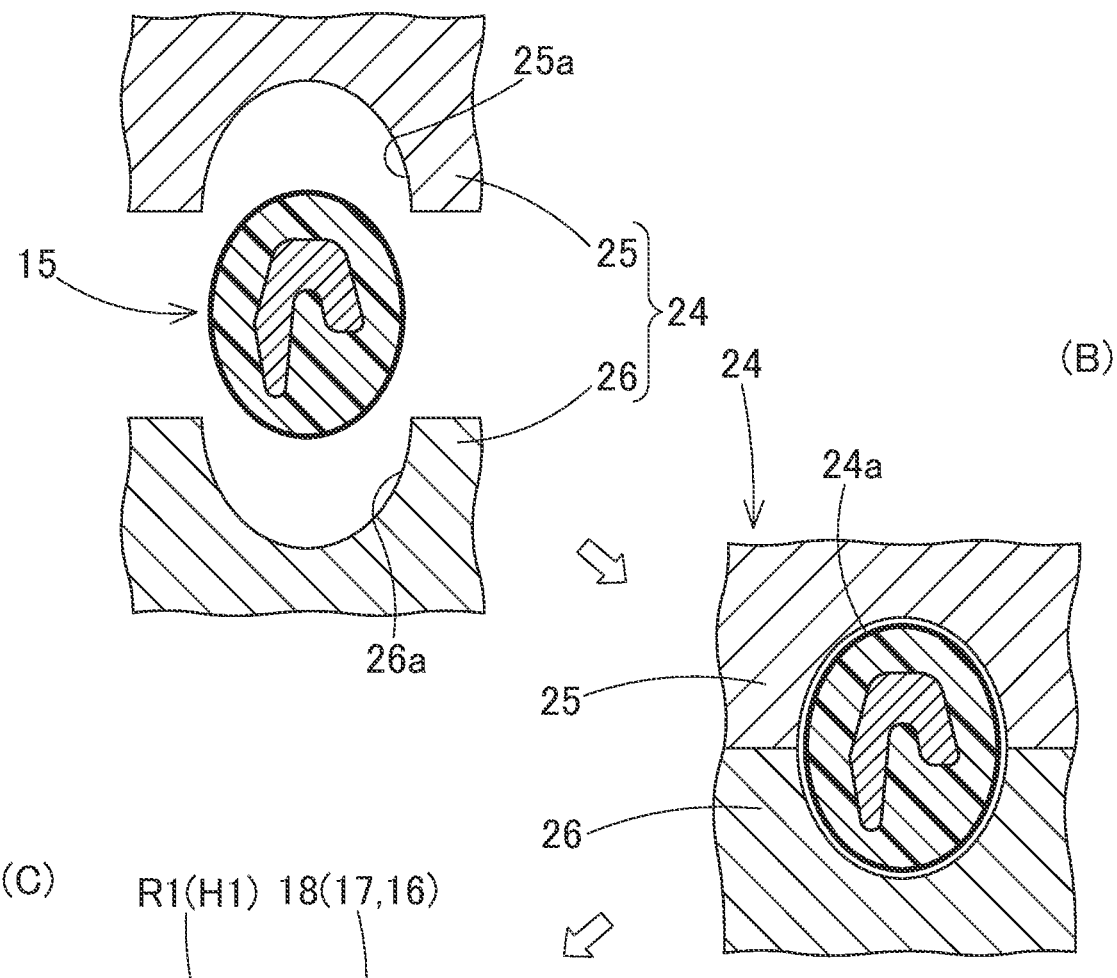
FIG. 4 is a view for explaining a manufacturing process of the handle of the first embodiment and shows a state after FIG. 3.

Then, in the second urethane layer molding process, as shown in (A) and (B) of FIG. 4, a molding die 24 for molding the second urethane layer 18 is used. The molding die 24 includes split dies 25 and 26. First, the molding die 24 is opened, the intermediate molded product 15 is set, and the molding die 24 is tightened. Then, as shown in (B) and (C) of FIG. 4, the urethane material for molding the second urethane layer 18 is injected into the cavity 24a. After that, if the injected urethane material is cured, the second urethane layer 18 can be molded. Before molding, a mold releasing agent is applied to die surfaces 25a and 26a of the split dies 25 and 26. After molding the second urethane layer 18, if the molding die 24 is opened and taken out, a molded product provided with the gripping portion R1, that is, the handle main body H1 can be obtained.

In the handle main body H1 manufactured in this way, a boss 5a of the boss portion B is tightened to the steering shaft of the vehicle while attaching a lower cover (not shown) to the lower side of the boss portion B. Further, if the airbag device 105 is attached to the upper side of the boss portion B of the handle main body H1, the handle W1 can be assembled and the handle W1 can be mounted on the vehicle. When the airbag device 105 is attached, the sensor layer 13 and the grip detection circuit 100 capable of detecting the grip of the driver are connected by a predetermined lead wire.

In the handle W1 mounted on the vehicle, when the hand of the driver approaches the sensor layer 13 of the gripping portion R1 so as to grip the gripping portion R1, since the predetermined grip detection circuit 100 detects that the capacitance has increased, the grip detection circuit 100 can detect the grip of the driver.

Then, in the handle W1 of the first embodiment, the sensor layer 13 is disposed at the same time of forming of the covering layer 10. That is, it is not necessary to separately wind a sheet material provided with the sensor layer around the covering layer 10. As a result, the handle W1 of the first embodiment can be easily manufactured even if the gripping portion R1 having the sensor layer 13 is provided. In other words, the sensor layer 13 is a mold coat layer 14 (in-mold coat layer). Therefore, the mold coat agent 28 formed of a urethane-based paint containing a conductive material is applied in advance to the die surfaces 21a and 22a of the molding die 20 when the covering layer 10 is die-molded. After the mold coat agent 28 is applied, the covering layer 10 provided with the sensor layer 13 can be formed simply by molding the covering layer 10. In a comparative example in which the sensor layer 13 is not used as the mold coat layer 14, for example, a urethane-based paint forming the sensor layer that is applied to an outer surface side of the covering layer after molding to form the sensor layer can be exemplified. However, in this comparative example, the process for applying a primer to the outer surface of the covering layer after molding or the process for drying after applying the urethane-based paint are required. Compared with this comparative example, in the first embodiment, since the above-mentioned primer applying process and drying process are not required, the product can be easily manufactured. Furthermore, in the first embodiment, the sensor layer 13 is a urethane-based paint of the same type as the covering layer 10 formed of urethane foam. Therefore, the mutual meltability (adhesiveness) between the covering layer 10 and the sensor layer 13 is also good, and the sensor layer 13 is unlikely to be displaced. Further, the sensor layer 13 of the handle W1 of the first embodiment is provided with a protective layer 16 on the surface thereof. Therefore, in the first embodiment, since the sensor layer 13 is not directly exposed on the surface side of the gripping portion R1, the grip detection of the gripping portion can be performed with good durability.

Therefore, the handle W1 of the first embodiment can be easily manufactured even if the gripping portion R1 includes the sensor layer 13 for detecting the grip.

In the handle W1 of the first embodiment, the protective layer 16 is disposed as the skin layer 17 formed of urethane foam, which is disposed by the die molding. That is, the handle W1 of the first embodiment includes the first urethane layer 11 and the second urethane layer 18. The first urethane layer 11 is the covering layer 10 on the back surface side of the sensor layer 13 on the grip core material portion 4 side of the core material 3. The second urethane layer 18 is the skin layer 17 on the surface side of the sensor layer 13.

Therefore, in the handle W1 of the first embodiment, the skin layer 17 as the protective layer 16 is configured as the second urethane layer 18 and can be configured with elasticity, so that the feeling when gripping the gripping portion R1 can be improved. Further, a predetermined pigment (beige pigment in the case of the embodiment) is added to the urethane foam material of the second urethane layer 18. Therefore, in the handle W1 of the first embodiment, the skin layer 17 can be formed as a predetermined color scheme, and the design of the handle W1 can be improved.

Further, in the first embodiment, the second urethane layer 18 has a density higher than that of the first urethane layer 11.

Therefore, in the first embodiment, since the dielectric constant of the second urethane layer 18 can be improved as compared with the first urethane layer 11, the parasitic capacitance generated between the sensor layer 13 and the grip core material portion 4 is increased can be suppressed, and the sensitivity of grip detection of the sensor layer 13 can be improved. As a result, in the first embodiment, the accuracy of grip detection can be improved.

Figure 5:
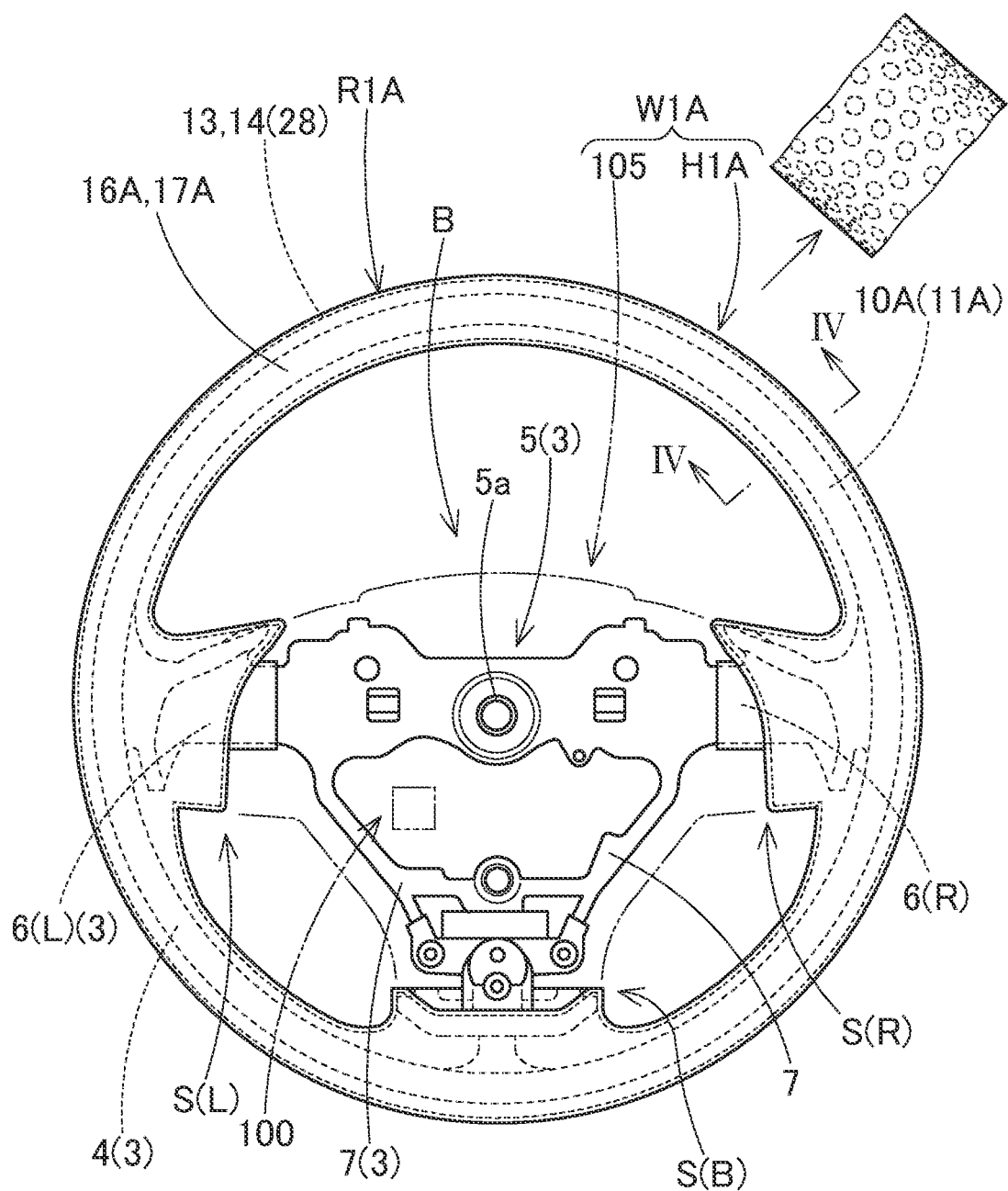
FIG. 5 is a schematic plan view showing a handle of a modified example of the first embodiment.
Figure 6:
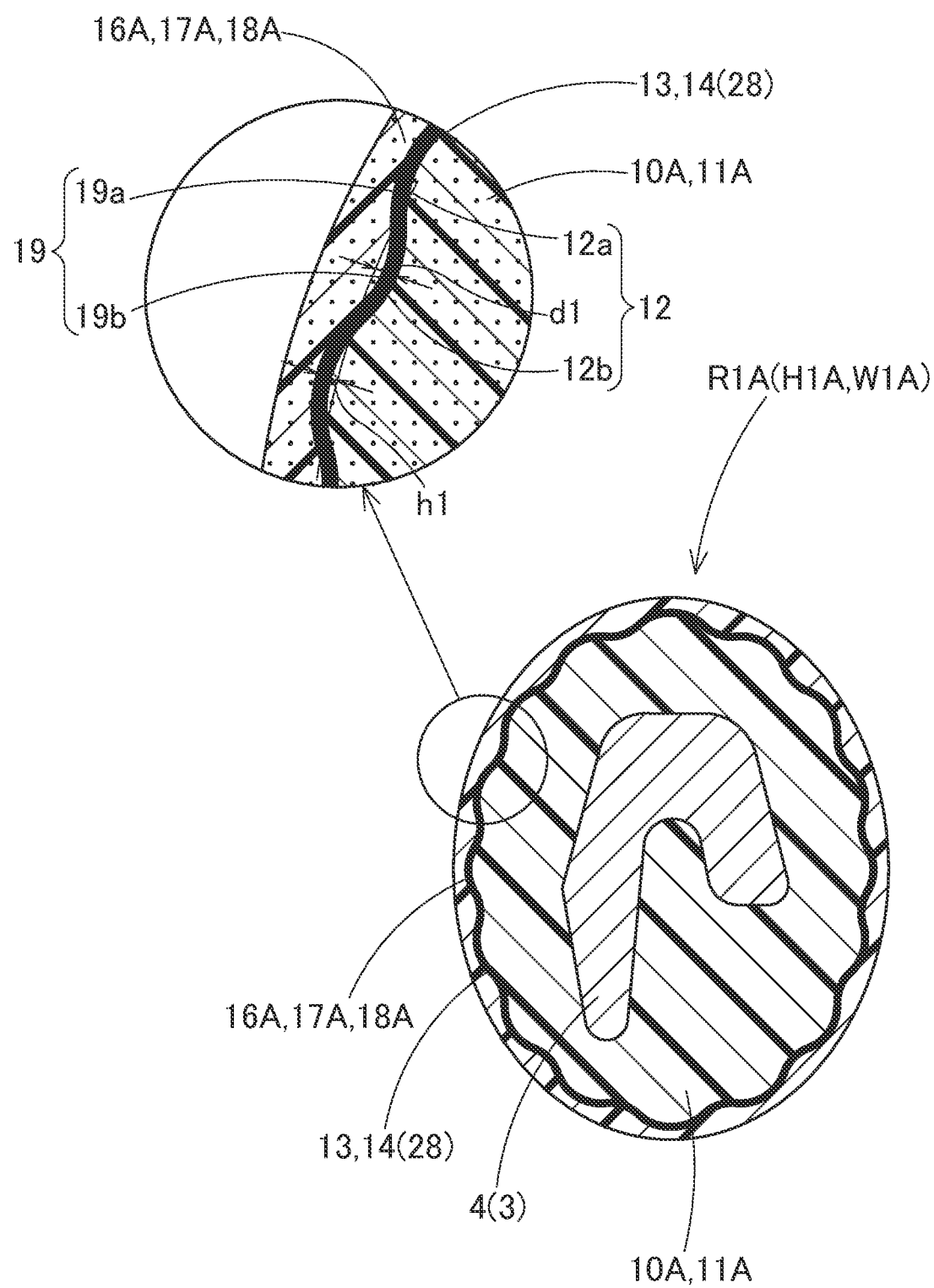
FIG. 6 is a sectional view of a gripping portion of the handle shown in FIG. 5 and corresponds to the VI-VI portion of FIG. 5.

In a case where the first urethane layer 11 and the second urethane layer 18 are disposed with the sensor layer 13 therebetween, the handle W1A shown in FIGS. 5 to 6 may be used. The handle W1A has fitting portions 12 and 19 in which the first urethane layer 11A and the second urethane layer 18A are fitted to each other with the sensor layer 13 therebetween. In this handle W1A, the fitting portions 12 and 19 can suppress the displacement of the second urethane layer 18A with respect to the first urethane layer 11A.

The handle W1A is different from the handle W1 of the first embodiment in that the gripping portion R1A of the handle main body H1A is provided with fitting portions 12 and 19. Therefore, in this handle W1A, other configurations are the same as those of the handle W1, and the same parts and members as those in the first embodiment are designated by the same reference numerals, and the description thereof will be omitted as appropriate.

The fitting portion 12 formed in the first urethane layer 11A includes a convex portion 12a that is rounded and raised so as to be separated from each other, and a concave portion 12b that is relatively concave with the convex portion 12a around the convex portion 12a. The fitting portion 19 formed on the second urethane layer 18A has an unevenness shape in which the fitting portion 12 of the first urethane layer 11A is fitted with the sensor layer 13 interposed therebetween. That is, the fitting portion 19 includes a concave portion 19a that fits the convex portion 12a of the fitting portion 12 of the first urethane layer 11A, and a convex portion 19b that fits the concave portion 12b of the fitting portion 12.

As the first urethane layer 11A and the second urethane layer 18A, the same urethane layers 11 and 18 of the first embodiment are used. A protruding height dimension h1 of the convex portion 12a sandwiching the sensor layer 13 from a neutral point of the unevenness is about 0.5 mm, and a concave depth dimension d1 of the concave portion 12b is about 0.5 mm.

As in the first embodiment, the manufacturing process of the handle main body H1A includes a mold coat agent applying process, a first urethane layer molding process, and a second urethane layer molding process. In the mold coat agent applying process, as shown in (A) and (B) of FIG. 7, a molding die 20A for molding the first urethane layer 11A as the covering layer 10A is used. First, the urethane-based paint forming the sensor layer 13 is applied to the die surfaces 21a and 22a of the split dies 21 and 22 of the molding die 20A as the mold coat agent 28 by the spray gun 27 as the applying device. Before applying the mold coat agent 28, a mold releasing agent is applied to the die surfaces 21a and 22a.

In this molding die 20A, the concave and convex portions 21b and 22b are formed on the die surfaces 21a and 22a of the split dies 21 and 22 so as to form the fitting portion 12.

Figure 7:
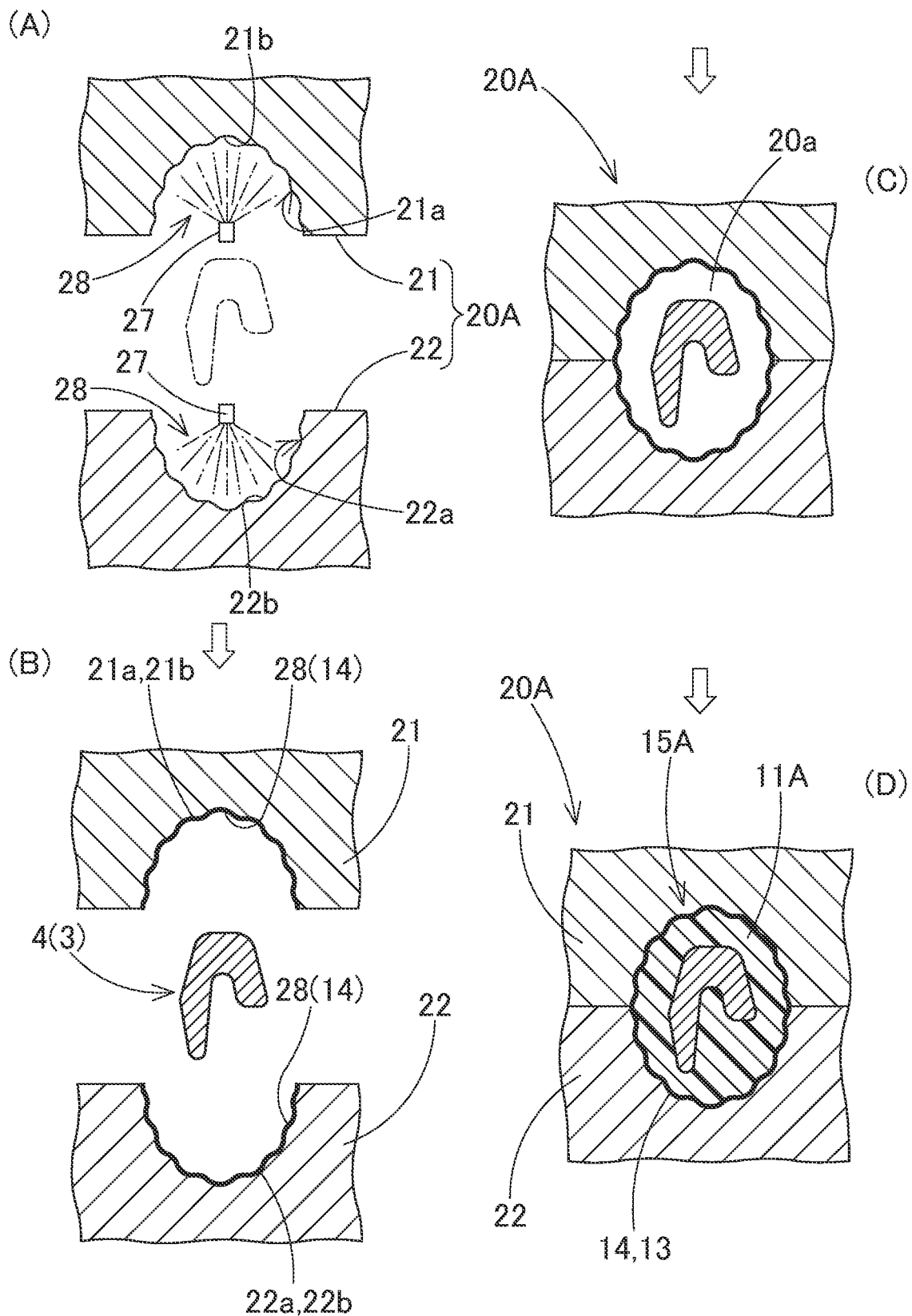
FIG. 7 is a view for explaining a manufacturing process of the handle shown in FIG. 5.
Figure 8:
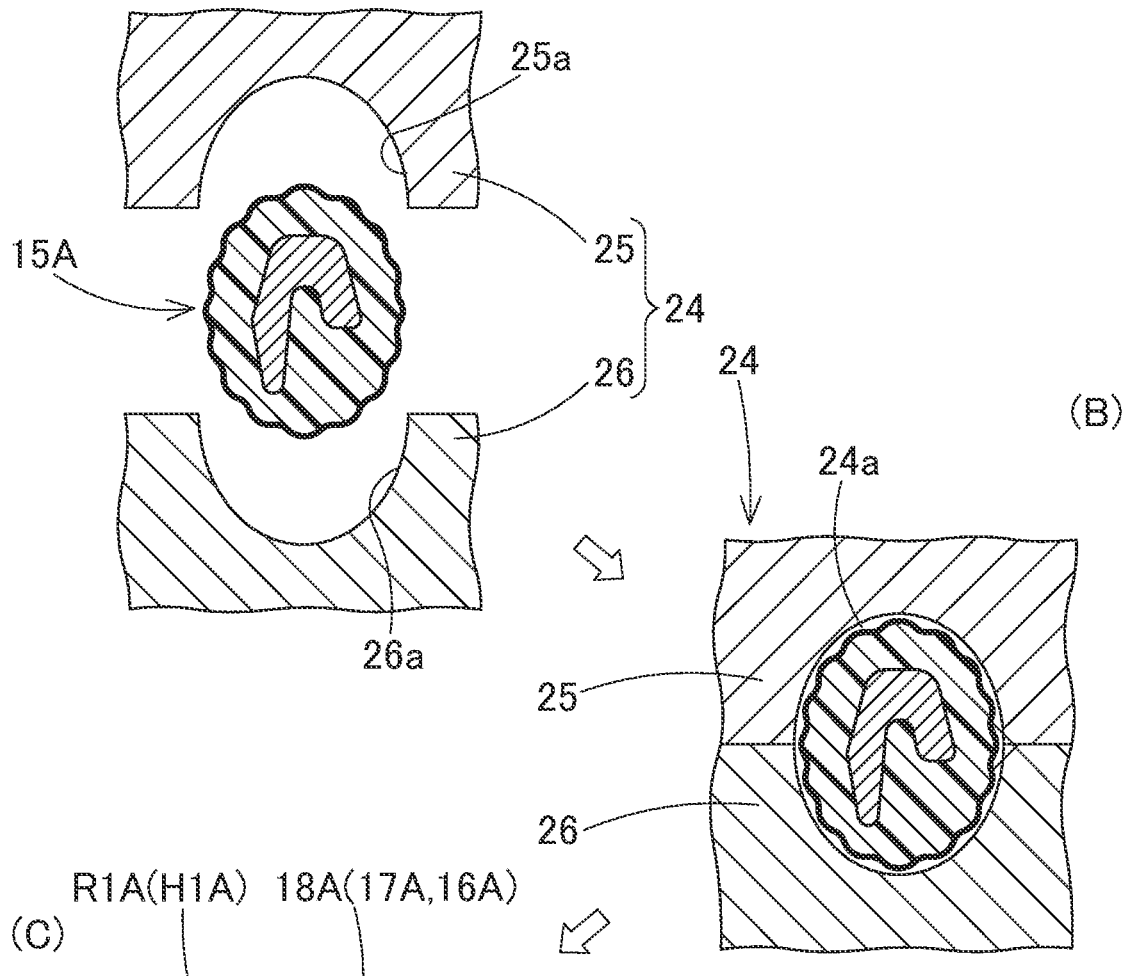
FIG. 8 is a view for explaining a manufacturing process of the handle shown in FIG. 5 and shows a state after FIG. 7.

In the first urethane layer molding process, as shown in (C) and (D) of FIG. 7, the molding die 20A configured of the split dies 21 and 22 is tightened, the urethane material for molding the first urethane layer 11A is injected and cured in the cavity 20a, and the intermediate molded product 15A obtained by molding the first urethane layer 11A is manufactured. Then, the molding die 20A is opened and the intermediate molded product 15A is taken out. In the subsequent second urethane layer molding process, as shown in (A) and (B) of FIG. 8, the molding die 24 formed of the split dies 25 and 26 for molding the second urethane layer 18A is used. First, the molding die 24 is opened, the intermediate molded product 15A is set, the molding die 24 is tightened, and as shown in (B) and (C) of FIG. 8, the urethane material molding the second urethane layer 18A is injected in the cavity 24a and cured, thereby molding the second urethane layer 18A. Before molding, a mold releasing agent is applied to die surfaces 25a and 26a of the split dies 25 and 26. After molding the second urethane layer 18A, if the die is opened and taken out, the molded product provided with the gripping portion R1A, that is, the handle main body H1A can be obtained.

In the handle main body H1A manufactured in this way, as in the first embodiment, the boss 5a of the boss portion B is tightened to the steering shaft of the vehicle while the lower cover (not shown) is attached to the lower side of the boss portion B, and the airbag device 105 is attached to the upper side of the boss portion B. As a result, the handle W1A can be assembled and the handle W1A can be mounted on the vehicle. When the airbag device 105 is attached, the sensor layer 13 and the grip detection circuit 100 capable of detecting the grip of the driver are connected by a predetermined lead wire.

In the handle W1A mounted on the vehicle, as in the first embodiment, when the hand of the driver approaches the sensor layer 13 of the gripping portion R1 so as to grip the gripping portion R1A, the predetermined grip detection circuit 100 detects that the capacitance has increased. Therefore, the handle W1A can detect the grip of the driver and can obtain the same operation and effect as those of the first embodiment. Further, in the handle W1A, the first urethane layer 11A and the second urethane layer 18A include the fitting portions 12 and 19 that are fitted to each other with the sensor layer 13 therebetween. Therefore, in the handle W1A, the deviation of the second urethane layer 18A with respect to the first urethane layer 11A is suppressed. That is, at the time of gripping of the gripping portion R1A, the second urethane layer 18A, which is the skin layer 17A as the protective layer 16A, is not deviated with respect to the first urethane layer 11A. As a result, in the handle W1A, it is possible to improve the feeling of the gripping portion R1A during steering when gripping.

In the illustrated example, the fitting portions 12 and 19 are configured by providing a large number of point-shaped convex portions 12a and 19b. However, if the deviation of the second urethane layer 18A with respect to the first urethane layer 11A is suppressed, the unevenness shape of the fitting portions 12 and 19 may be configured of various shapes such as a triangular pyramid, a columnar shape, and a ridge along a circumferential direction of the gripping portion R1A in a range in which the mold releasing from the molding die 20A is not hindered.

Figure 9:
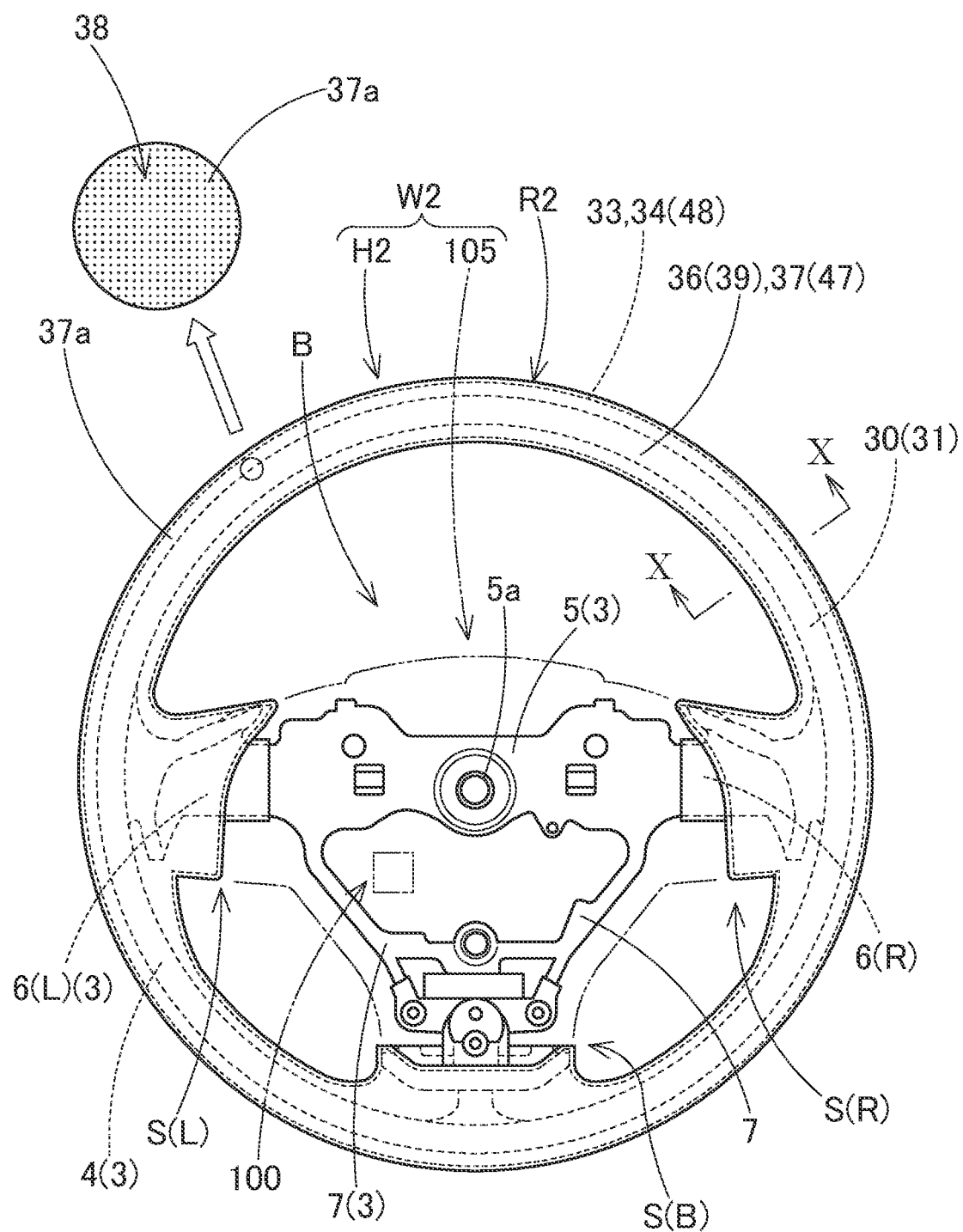
FIG. 9 is a schematic plan view showing a handle of a second embodiment.
Figure 10:
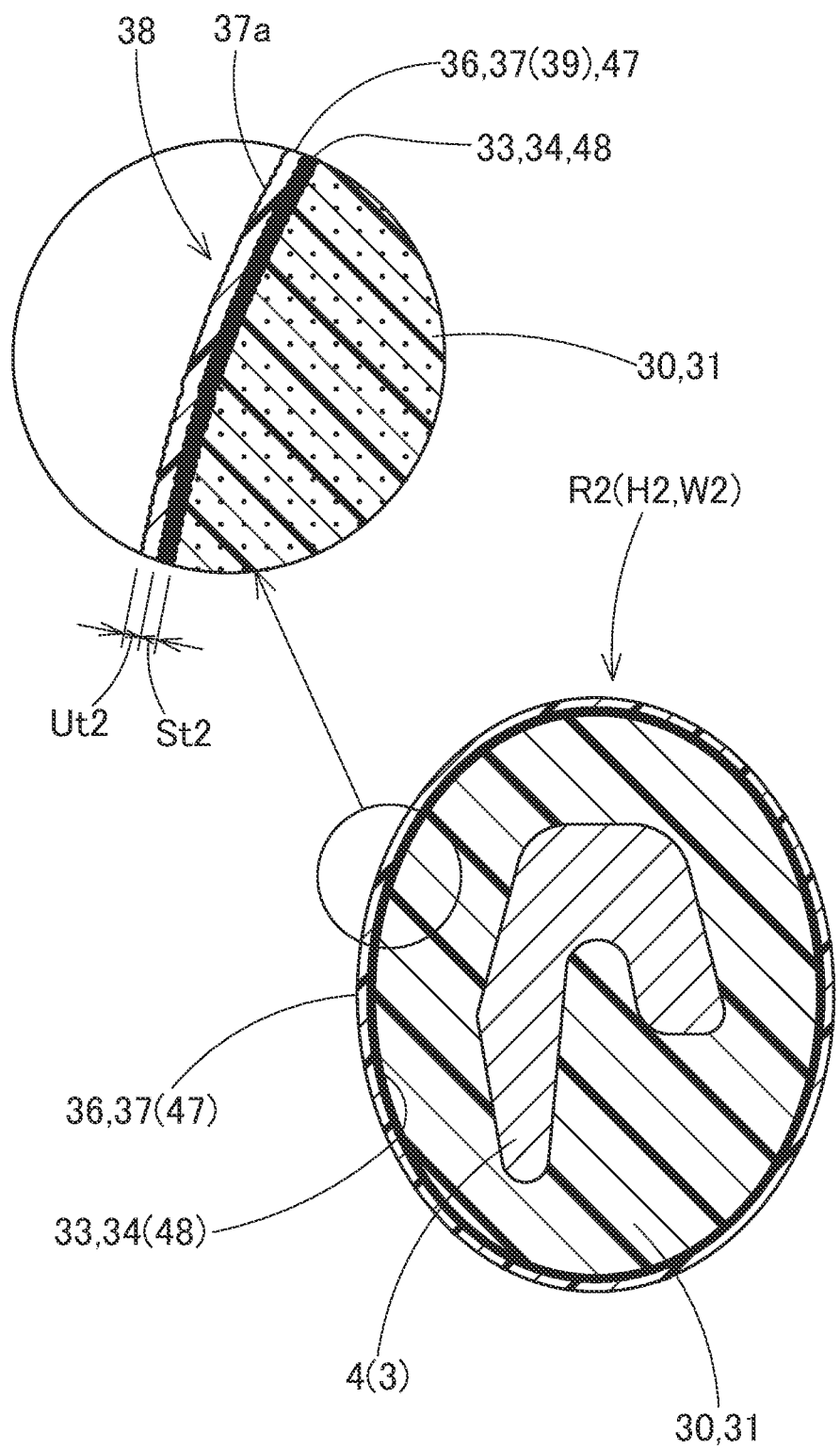
FIG. 10 is a sectional view of a gripping portion of the handle of the second embodiment and corresponds to the X-X portion of FIG. 9.

Next, a handle W2 of a second embodiment shown in FIGS. 9 to 11 will be described. In the handle W2 of the second embodiment, the core material 3, the airbag device 105, the lower cover (not shown), and the like are the same as those of the first embodiment. The handle W2 is different from the first embodiment in that the structure covering the core material 3 of the gripping portion R2, that is, the grip core material portion 4, is different from that of the first embodiment.

Also in the handle W2 of the second embodiment, as in the first embodiment, the gripping portion R2 includes the grip core material portion 4 of the core material 3, the covering layer 30 formed of urethane foam, which is disposed by the die molding so as to cover the periphery of the grip core material portion 4, and the sensor layer 33. As in the first embodiment, the sensor layer 33 is formed of a mold coat agent 48 formed of the urethane-based paint containing a conductive material (conductive carbon) (see FIG. 11). The mold coat agent 48 is applied to the die surfaces 41a and 42a of the molding die 40 (see FIG. 11) for molding the covering layer 30, and is disposed on the surface side of the covering layer 30 at the time of molding the covering layer 30. Further, the sensor layer 33 is covered with the protective layer 36 disposed on the surface side.

In the case of the second embodiment, the protective layer 36 is disposed as a top coat layer 37 formed of a urethane-based paint. Further, the top coat layer 37 is formed with grain 38 such as satin finish on the outer surface 37a side.

In the case of the second embodiment, a thickness dimension St2 of the sensor layer 33 is set to about 5 to 50 μm, preferably 20 μm within a range of about 10 to 30 μm in consideration of conductivity, durability, and feeling. A thickness dimension Ut2 of the top coat layer 37 is set to 20 μm in a range of about 10 to 30 μm so that the durability (wear resistance) and the grain pattern become clear.

The manufacturing process of the handle main body H2 of the second embodiment includes a mold coat agent applying process and a urethane layer molding process.

Figure 11:
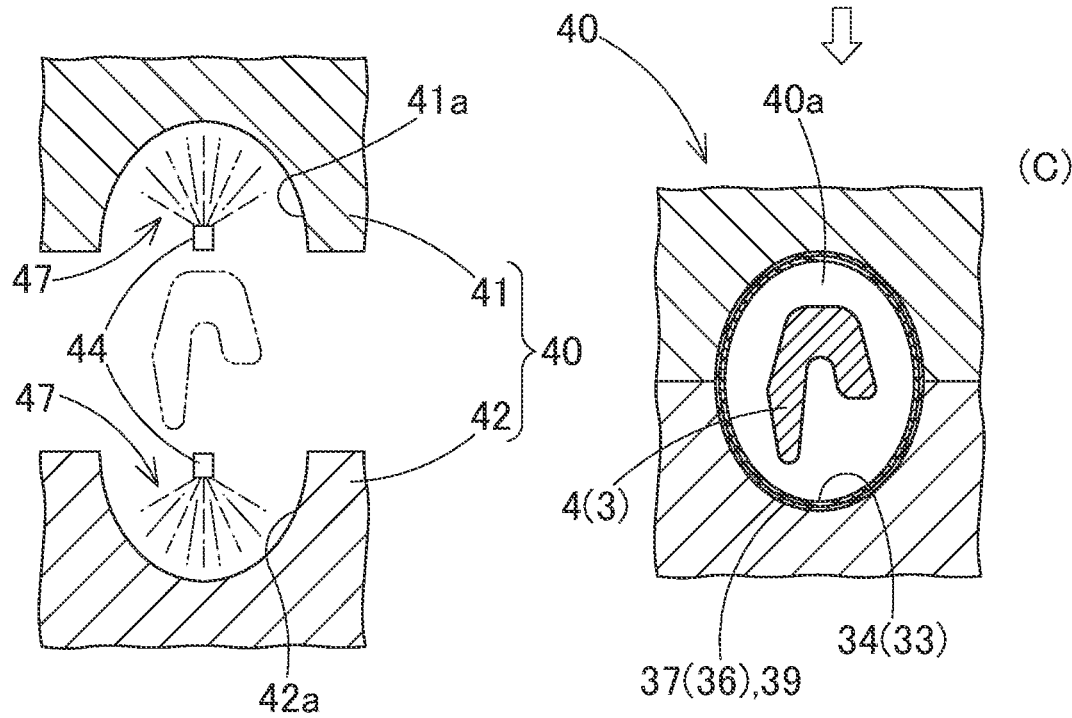
FIG. 11 is a view for explaining a manufacturing process of the handle of the second embodiment.
Figure 11:
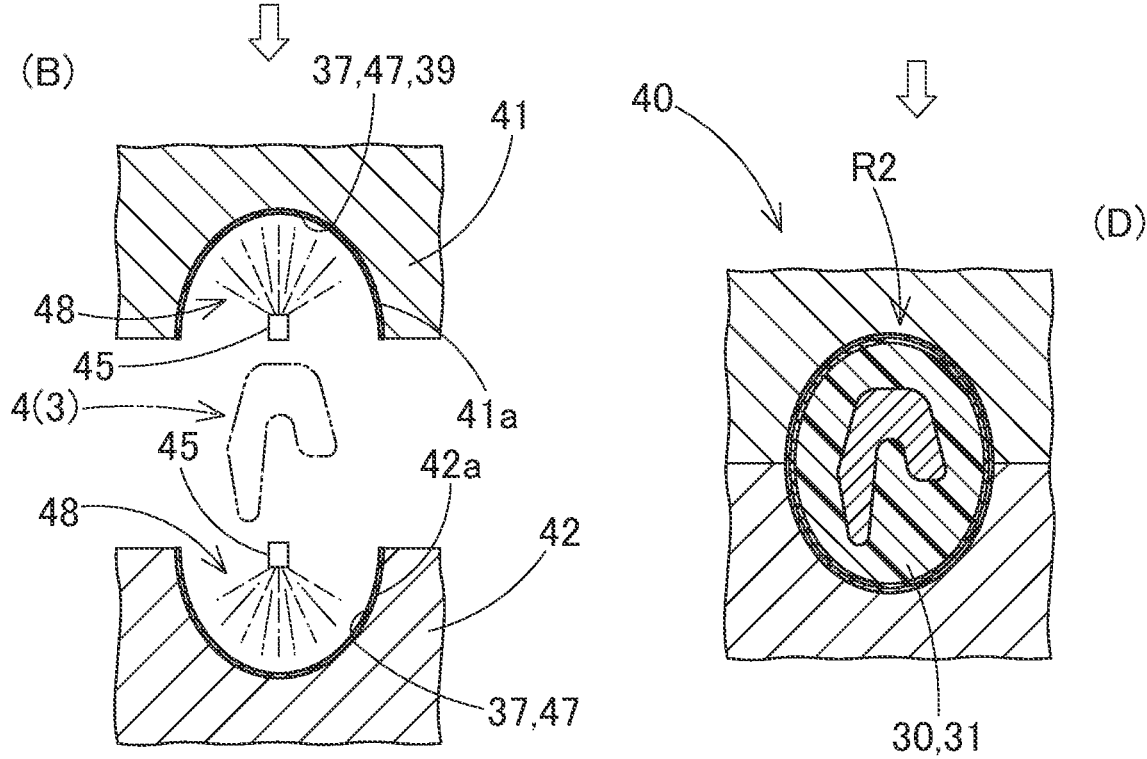
Figure 12:
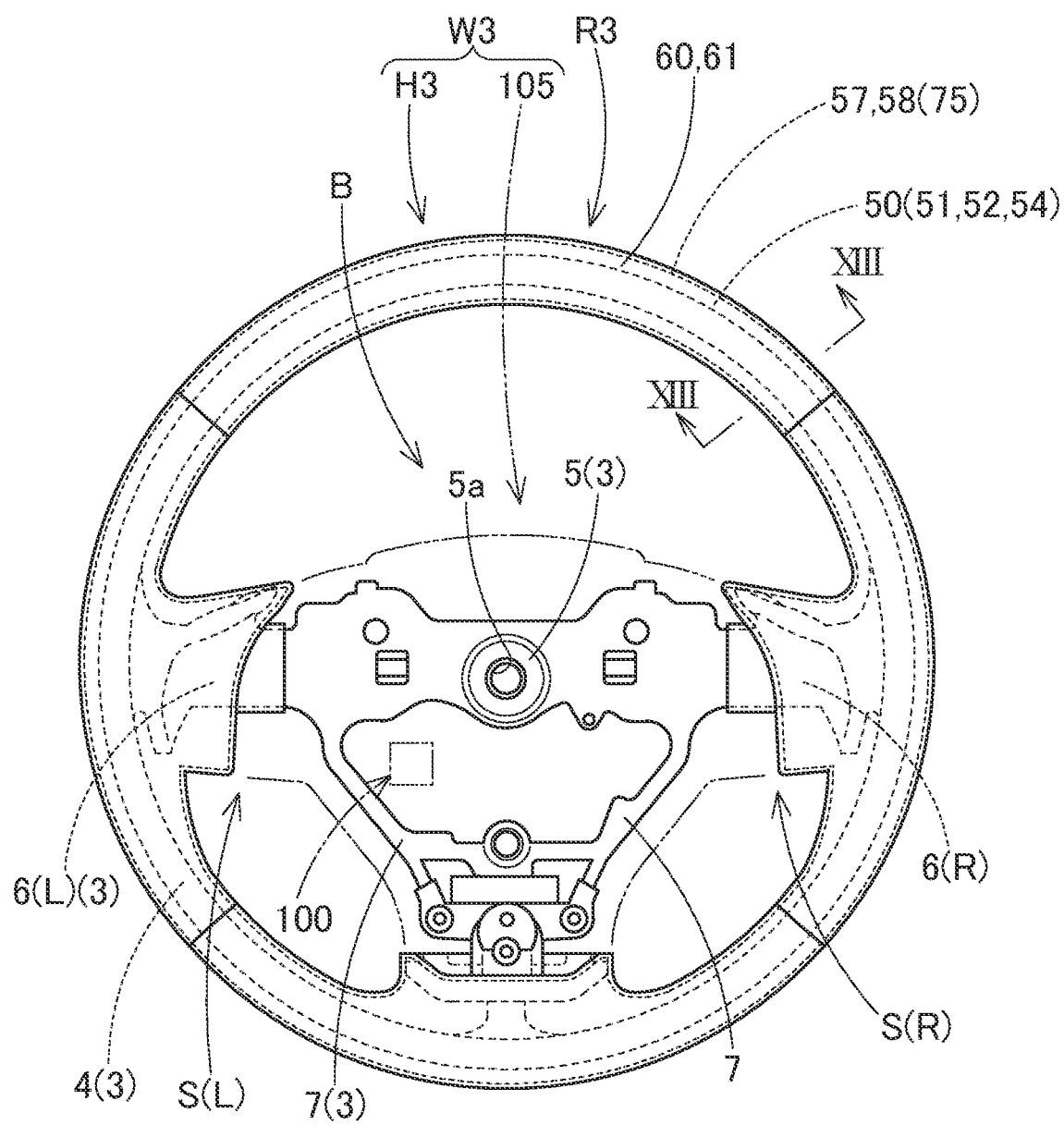
FIG. 12 is a schematic plan view showing a handle of a third embodiment.
Figure 13:
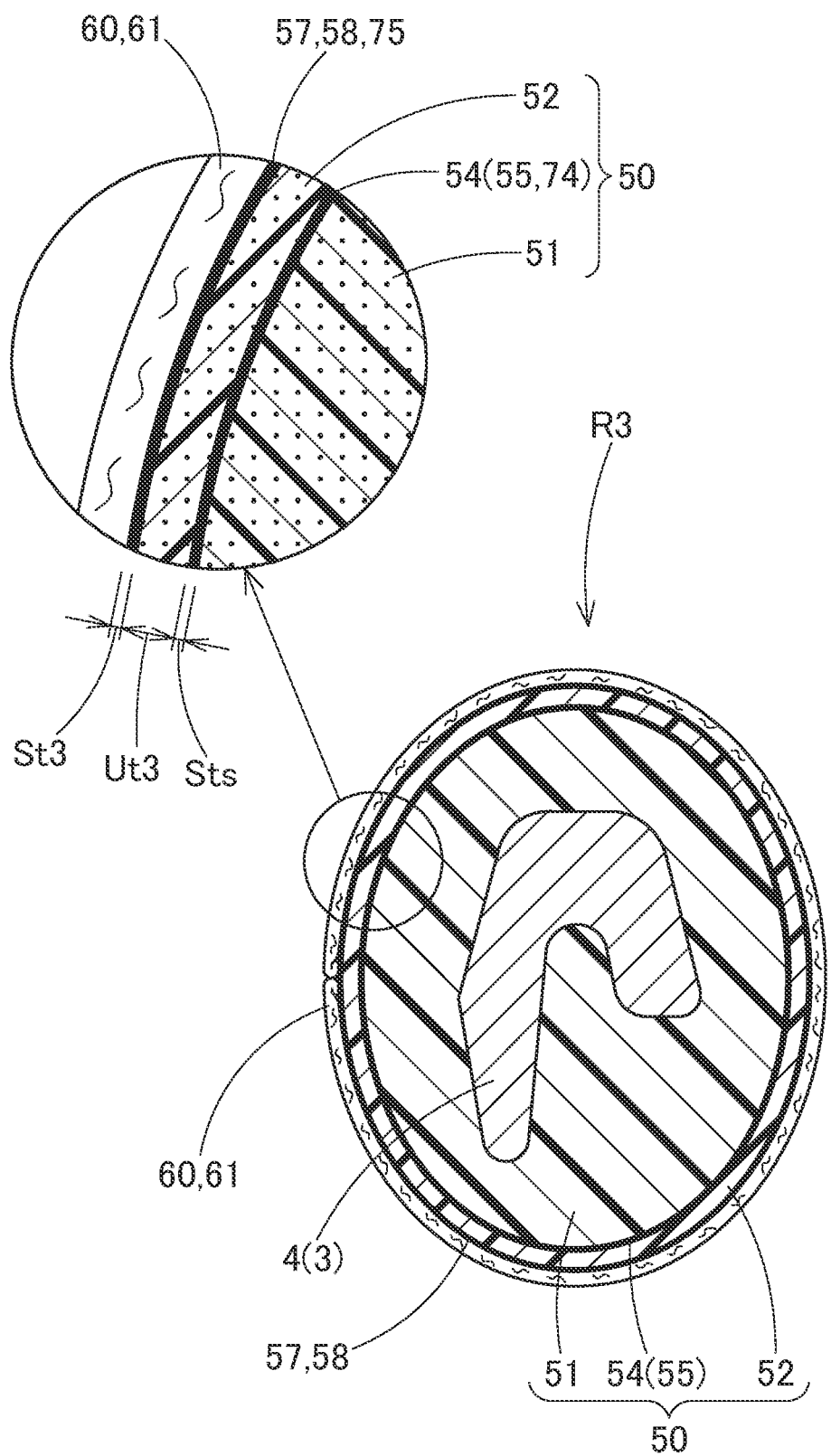
FIG. 13 is a sectional view of a gripping portion of the handle of the third embodiment and corresponds to the XIII-XIII portion of FIG. 12.

First, in the mold coat agent applying process, as shown in (A) of FIG. 11, the molding die 40 for molding the urethane layer 31 as the covering layer 30 is used. Then, the first mold coat agent 47 formed of the urethane-based paint forming the top coat layer 37 is first applied to the die surfaces 41a and 42a of the split dies 41 and 42 of the molding die 40 by the spray gun 44 as the applying device. The die surfaces 41a and 42a are formed with predetermined unevenness on which the grain pattern can be formed. Further, before applying the first mold coat agent 47, the mold releasing agent is applied to the die surfaces 41a and 42a.

Then, after the applied first mold coat agent 47 is cured, that is, after the formation of the first mold coat layer 39, as shown in (B) and (C) of FIG. 11, the urethane-based paint forming the sensor layer 33 is applied so as to be superimposed on the first mold coat layer 39 as the second mold coat agent 48 by the spray gun 45 as the applying device. Incidentally, if the top coat layer 37 is the first mold coat layer 39, the sensor layer 33 is formed by applying the second mold coat agent 48 of the second time to the die surfaces 41a and 42a so as to be the second mold coat layer 34.

Then, as the urethane layer molding process, as shown in (C) and (D) of FIG. 11, if the molding die 40 is tightened, and the urethane material for molding the urethane layer 31 is injected into the cavity 40a and cured, the gripping portion R2 obtained by molding the urethane layer 31 of the covering layer 30 can be manufactured. The handle main body H2 can be obtained by taking it out from the molding die 40 which has been opened.

In the handle main body H2, as in the first embodiment, if the boss 5a of the boss portion B is tightened to the steering shaft of the vehicle while the lower cover (not shown) is attached to the lower side of the boss portion B, and the airbag device 105 is attached to the upper side of the boss portion B, the handle W2 can be assembled and the handle W2 can be mounted on the vehicle. When the airbag device 105 is attached, the sensor layer 33 and the grip detection circuit 100 capable of detecting the grip of the driver are connected by a predetermined lead wire.

In the handle W2 mounted on the vehicle, if the hand of the driver approaches the sensor layer 33 of the gripping portion R2 so as to grip the gripping portion R2, since the predetermined grip detection circuit 100 detects that the capacitance has increased, the grip detection circuit 100 can detect the grip of the driver.

In this second embodiment, the urethane-based paint of the top coat layer 37 is used as the first mold coat agent 47, and the mold coat agent forming the sensor layer 33 is used as the second mold coat agent 48, and they are sequentially applied to the die surfaces 41a and 42a of the covering layer 30. At the time of molding the covering layer 30, the sensor layer 33 and the protective layer 36 are disposed on the surface side of the covering layer 30.

Therefore, in the second embodiment, if the first mold coat agent 47 and the second mold coat agent 48 are sequentially applied to the die surfaces 41a and 42a of the molding die 40 of the covering layer 30 to mold the covering layer 30. For example, the sensor layer 33 and the top coat layer 37 as the protective layer 36 that protects the sensor layer 33 can be formed at the same time. As a result, in the second embodiment, the gripping portion R2 provided with the sensor layer 33 having durability can be formed more easily. Further, since the sensor layer 33 is covered with the thin top coat layer 37 and disposed on the outer surface side of the gripping portion R2, the handle W2 of the second embodiment has good grip detection sensitivity.

Further, in the second embodiment, the top coat layer 37 is disposed with the grain 38. That is, if the top coat layer 37 has the same color of black scheme as that of the sensor layer 33, the color of black scheme of the sensor layer 33 will not be conspicuous from the outer surface side of the gripping portion R2 even if it is thin. Therefore, in the handle W2 of the second embodiment, the gripping portion R2 can be a matt black design, and the design of the gripping portion R2 can be improved.

Of course, the top coat layer 37 may be formed by incorporating a pigment or the like of a desired color other than the black scheme into the first mold coat agent 47.

Next, a handle W3 of a third embodiment shown in FIGS. 12 to 15 will be described. Even in the handle W3 of the third embodiment, the core material 3, the airbag device 105, the lower cover (not shown), and the like are the same as those of the first embodiment, and the difference is that the structure covering the core material 3 of the gripping portion R3, that is, the grip core material portion 4 is different from that of the first embodiment.

Also in the handle W3 of the third embodiment, as in the first embodiment, the gripping portion R3 includes the grip core material portion 4 of the core material 3, a covering layer 50 formed of urethane foam disposed by the die molding so as to cover the periphery of the grip core material portion 4, and a sensor layer 57. As in the first embodiment, the sensor layer 57 is formed of a mold coat agent 75 formed of the urethane-based paint containing a conductive material (conductive carbon) (see FIG. 15). The mold coat agent 75 is applied to die surfaces 68a and 69a of a molding die 67 (see FIG. 15) for molding a second urethane layer 52, which is described later, of the covering layer 50 so as to be disposed as the sensor layer 57 on the surface side of the second urethane layer 52 at the time of molding the second urethane layer 52 of the covering layer 50. Further, the sensor layer 57 is covered with a protective layer 60 disposed on the surface side.

In the case of the third embodiment, the protective layer 60 is a skin material 61 attached to an outer surface of the sensor layer 57. In the case of the third embodiment, the skin material 61 is formed of leather.

Further, in the third embodiment, the covering layer 50 formed of urethane foam includes a first urethane layer 51 on the grip core material portion 4 side of the core material 3, a second urethane layer 52 on a back surface side of the sensor layer 57, and a shield layer 54 disposed between the first urethane layer 51 and the second urethane layer 52.

The shield layer 54 is formed of a first mold coat agent 74 formed of the urethane-based paint containing the conductive material (for example, conductive carbon). Therefore, the sensor layer 57 is formed of a second mold coat agent 75. That is, the first mold coat agent 74 is applied to die surfaces 64a and 65a of a molding die 63 (see FIG. 14) of the first urethane layer 51 at the time of the die molding. Then, at the time of molding the first urethane layer 51, the shield layer 54 as the first mold coat layer 55 is formed by being disposed on the surface side of the first urethane layer 51. Further, the second mold coat agent 75 forming the sensor layer 57 is applied to the die surfaces 68a and 69a of the molding die 67 of the second urethane layer 52 at the time of the die molding. Then, at the time of molding the second urethane layer 52, the sensor layer 57 as the second mold coat layer 58 is disposed on the surface side of the second urethane layer 52.

In the case of the third embodiment, a thickness dimension St3 of the sensor layer 57 is set to about 5 to 50 μm, preferably 20 μm within a range of about 10 to 30 μm in consideration of conductivity, durability, and feeling. A thickness dimension Sts of the shield layer 54 is set to about 10 to 100 μm, preferably 50 μm within a range of about 30 to 60 μm. A thickness dimension Ut3 of the second urethane layer 52 is set to 2 mm within a range of about 1 to 3 mm in consideration of durability, feeling, and sensitivity of the sensor layer 57.

Further, the first urethane layer 51 and the second urethane layer 52 formed of urethane foam have substantially the same density.

The manufacturing process of the handle main body H3 of the third embodiment includes a shielding mold coat agent applying process, a first urethane layer molding process, a sensor mold coat agent applying process, a second urethane layer molding process, and a leather wrapping process.

Figure 14:
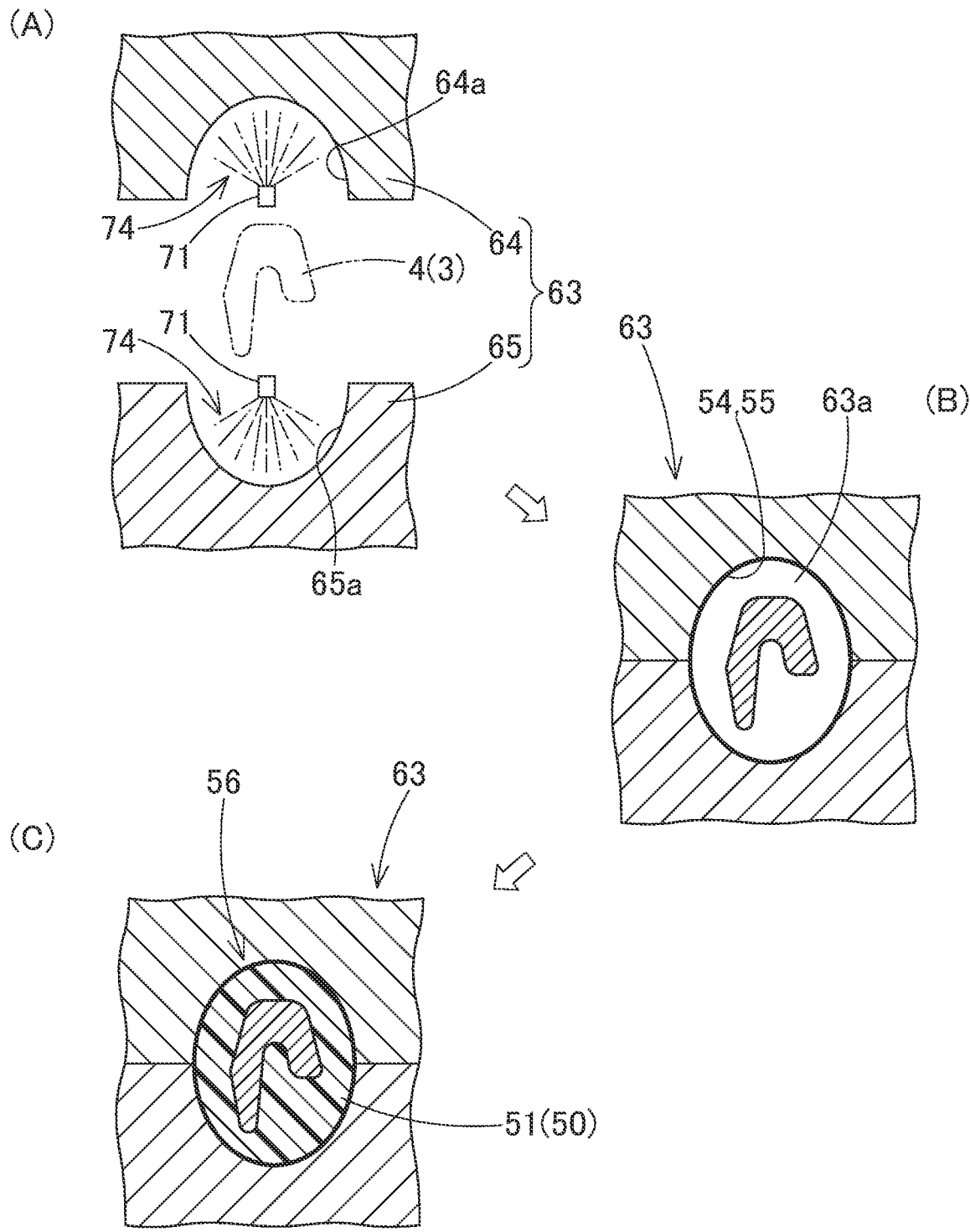
FIG. 14 is a view for explaining a manufacturing process of the handle of the third embodiment.

First, in the shielding mold coat agent applying process, as shown in (A) and (B) of FIG. 14, the molding die 63 for molding the first urethane layer 51 as the covering layer 50 is used. Then, the urethane-based paint forming the shield layer 54 is applied to the die surfaces 64a and 65a of the split dies 64 and 65 of the molding die 63 as the first mold coat agent 74 by the spray gun 71 as the applying device. Before applying the mold coat agent 74, the mold releasing agent is applied to the die surfaces 64a and 65a.

Then, in the first urethane layer molding process, as shown in (B) and (C) of FIG. 14, the molding die 63 is tightened, the urethane material for molding the first urethane layer 51 is injected into the cavity 63a and cured, and an intermediate molded product 56 is manufactured by molding the first urethane layer 51. The molding die 63 is opened and the intermediate molded product 56 is taken out.

Figure 15:
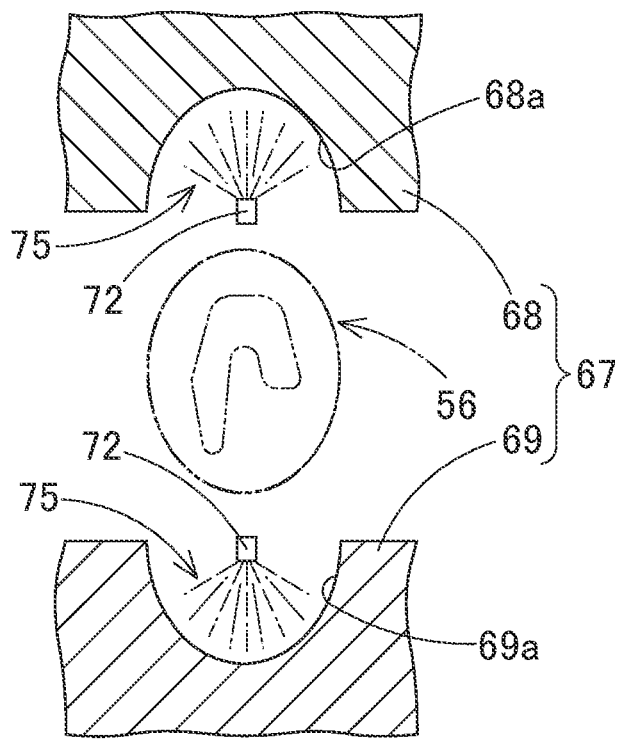
FIG. 15 is a view for explaining a manufacturing process of the handle of the third embodiment and shows a state after FIG. 14.
Figure 15:
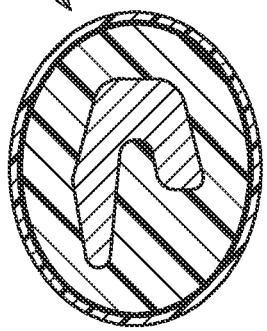
Figure 15:
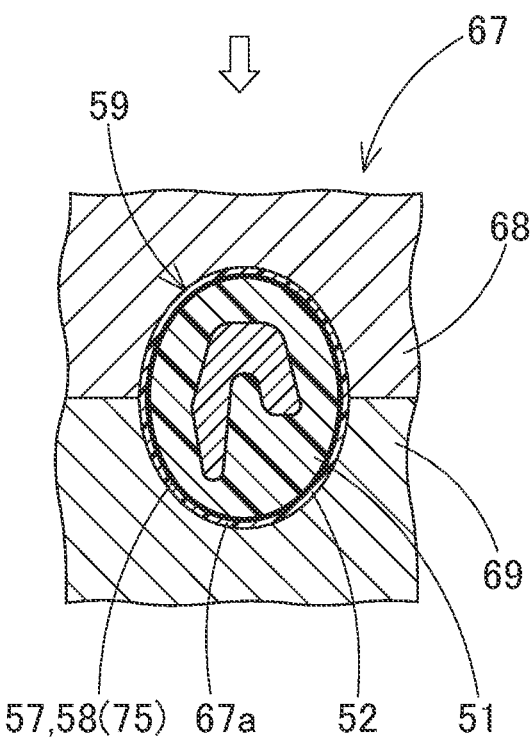
Figure 15:
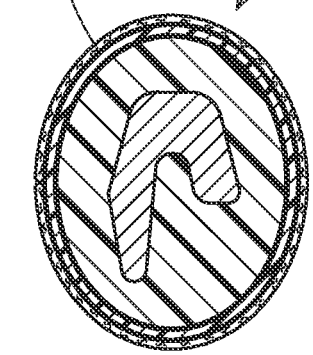

Then, in the sensor mold coat agent applying process, as shown in (A) of FIG. 15, the molding die 67 for molding the second urethane layer 52 as the covering layer 50 is used. Then, the urethane-based paint forming the sensor layer 57 is applied to the die surfaces 68a and 69a of the split dies 68 and 69 of the molding die 67 as the second mold coat agent 75 by the spray gun 72 as the applying device. Before applying the mold coat agent 75, the mold releasing agent is applied to the die surfaces 68a and 69a.

Then, in the second urethane layer molding process, as shown in (A) and (B) of FIG. 15, the intermediate molded product 56 is set in the opened molding die 67, the molding die 67 is tightened, and the urethane material for molding the second urethane layer 52 is injected into the cavity 67a and cured to mold the second urethane layer 52. Then, after molding the second urethane layer 52, if the die is opened and taken out, the intermediate molded product 59 before skin winding can be obtained (see (C) of FIG. 15).

After that, if the skin material 61 formed of leather is wound around the outer surface of the sensor layer 57 while being attached thereto, the gripping portion R3 of the handle main body H3 can be manufactured (see (D) of FIG. 15).

In the handle main body H3 manufactured in this way, if the boss 5a of the boss portion B is tightened to the steering shaft of the vehicle while the lower cover (not shown) is attached to the lower side of the boss portion B, and the airbag device 105 is attached to the upper side of the boss portion B, the handle W3 can be assembled. At the same time, the handle W3 can be mounted on the vehicle. When the airbag device 105 is attached, the sensor layer 57 and the grip detection circuit 100 capable of detecting the grip of the driver are connected by a predetermined lead wire.

In the handle W3 mounted on the vehicle, when the hand of the driver approaches the sensor layer 57 of the gripping portion R3 so as to grip the gripping portion R3, since the predetermined grip detection circuit 100 detects that the capacitance has increased, the grip detection circuit 100 can detect the grip of the driver.

Then, in the handle W3 of the third embodiment, the first mold coat layer 55 formed of the first mold coat agent 74 containing the conductive material is disposed on the core material 3 (grip core material portion 4) side of the sensor layer 57, as the shield layer 54. Therefore, in the handle W3, the influence of the parasitic capacitance on the grip core material portion 4 side can be suppressed, and the sensitivity of gripping detection in the sensor layer 57 can be improved. Of course, the protective layer 60 covering the sensor layer 57 on the surface side of the gripping portion R3 can serve as the skin material 61 attached to the sensor layer 57, and the design of the gripping portion R3 can be improved by the design of the skin material 61.

Figure 16:
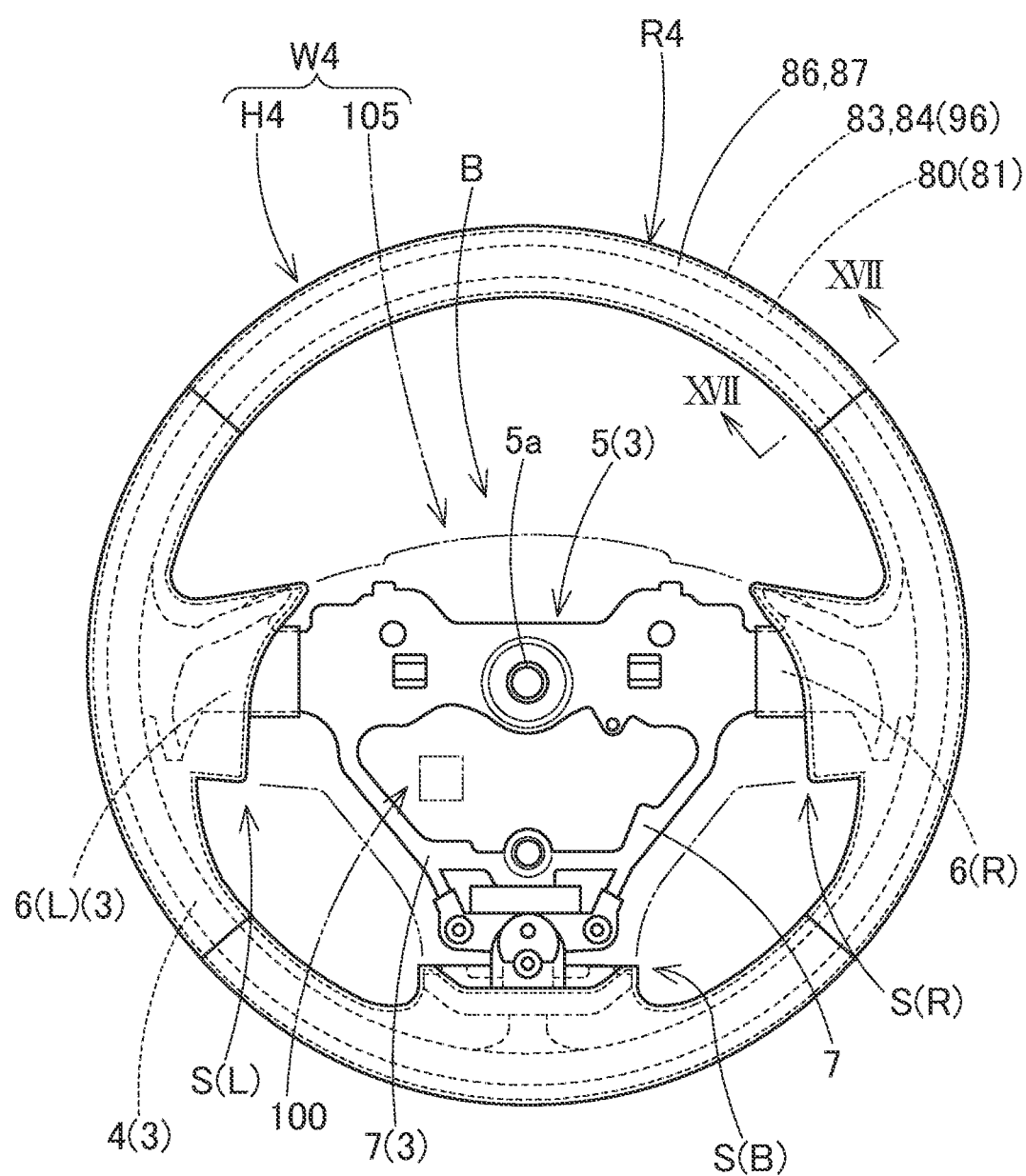
FIG. 16 is a schematic plan view showing a handle of a fourth embodiment.
Figure 17:
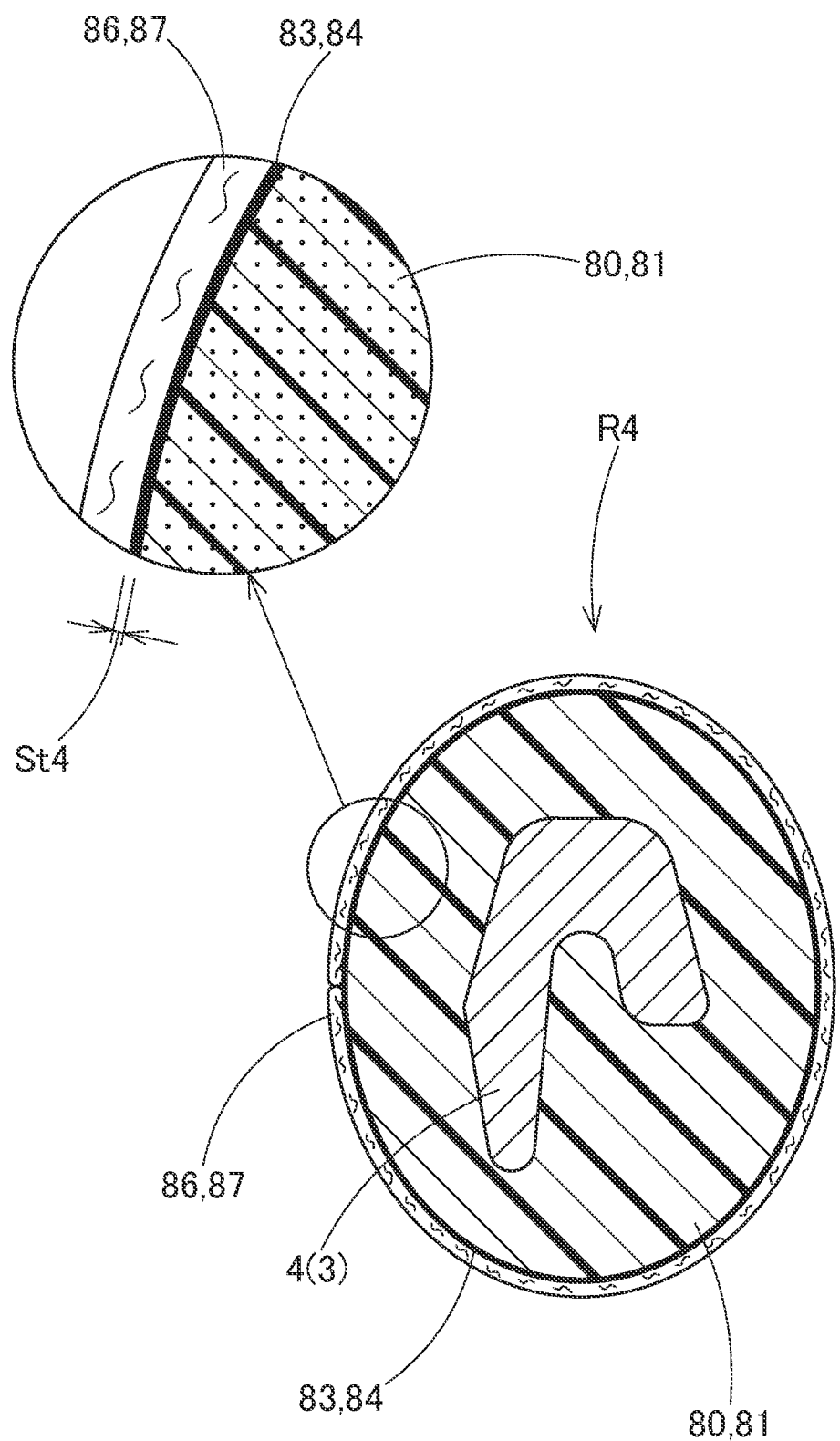
FIG. 17 is a sectional view of a gripping portion of the handle of the fourth embodiment and corresponds to the XVII-XVII portion of FIG. 16.
Figure 18:
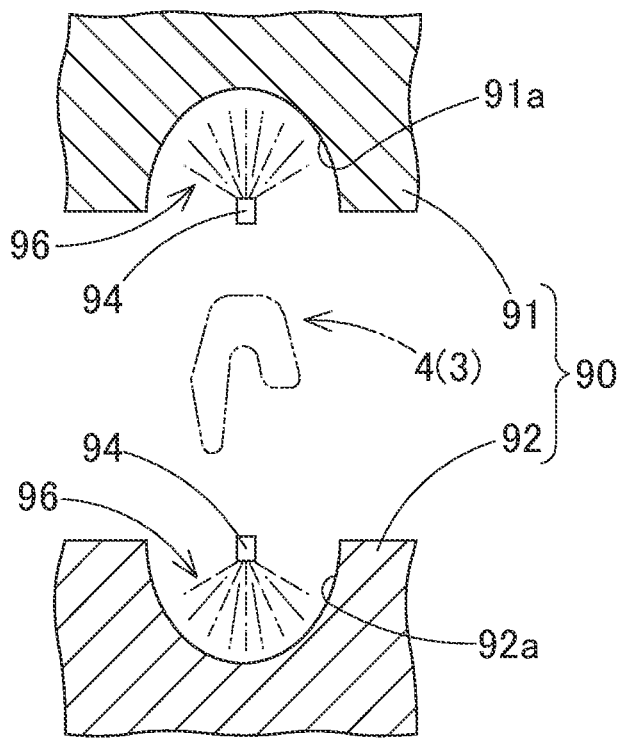
FIG. 18 is a view for explaining a manufacturing process of the handle of the fourth embodiment.
Figure 18:
Figure 18:
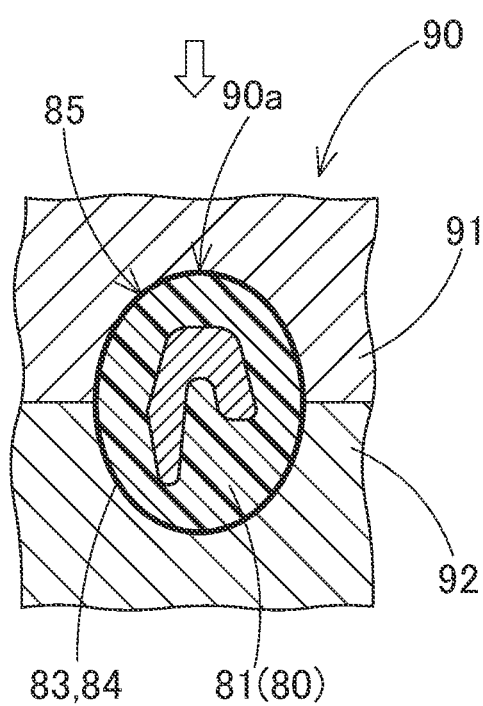
Figure 18:
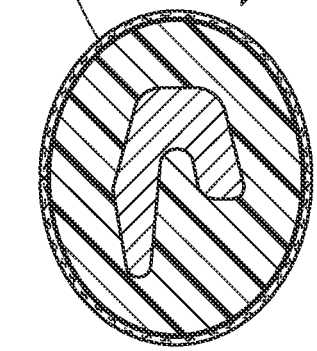

In a case where the protective layer is disposed as the skin material to be attached to the outer surface of the sensor layer, it may be configured like the handle W4 of the fourth embodiment shown in FIGS. 16 to 18. The handle W4 includes the gripping portion R4 of the handle main body H4. The griping portion R4 includes the grip core material portion 4 of the core material 3, a covering layer 80 formed of urethane foam to cover the material portion 4, a sensor layer 83, and a skin material 87 as a protective layer 86 that protects the sensor layer 83.

As in the first embodiment, the sensor layer 83 is formed of a mold coat agent 96 (see FIG. 16) formed of the urethane-based paint containing the conductive material (conductive carbon). Then, the mold coat agent 96 is applied to die surfaces 91a and 92a of a molding die 90 for molding the covering layer 80, and is disposed on the surface side of the covering layer 30 as the mold coat layer 84 that is the sensor layer 83 at the time of molding the covering layer 30. Further, the sensor layer 83 is covered with a skin material 87 (protective layer 86) formed of leather disposed on the surface side.

In the case of the fourth embodiment, a thickness dimension St4 of the sensor layer 83 is set to about 5 to 50 μm, preferably 20 μm within a range of about 10 to 30 μm in consideration of conductivity, durability, and feeling.

The manufacturing process of the handle main body H4 of the fourth embodiment includes a mold coat agent applying process, a urethane layer molding process, and a skin winding process.

First, in the mold coat agent applying process, as shown in (A) of FIG. 18, the molding die 90 for molding the urethane layer 81 as the covering layer 80 is used. Then, the urethane-based paint forming the sensor layer 83 is applied to the die surfaces 91a and 92a of the split dies 91 and 92 of the molding die 90 as the mold coat agent 96 by the spray gun 94 as the applying device. Before applying the mold coat agent 96, the mold releasing agent is applied to the die surfaces 91a and 92a.

Then, in the urethane layer molding process, as shown in (B) and (C) of FIG. 18, the molding die 90 is tightened, and the urethane material for molding the urethane layer 81 is injected into the cavity 90a and cured to form the urethane layer 81 of the covering layer 80. Then, after molding the urethane layer 81, if the die is opened and taken out, an intermediate molded product 85 in which the mold coat layer 84 as the sensor layer 83 is disposed on the outer peripheral surface can be obtained.

After that, if the skin material 87 formed of leather is wound around the outer surface of the sensor layer 83 while being attached thereto, the gripping portion R4 of the handle main body H4 can be manufactured (see (D) of FIG. 18).

In the handle main body H4, as in the first embodiment, if the boss 5a of the boss portion B is tightened to the steering shaft of the vehicle while the lower cover (not shown) is attached to the lower side of the boss portion B, and the airbag device 105 is attached to the upper side of the boss portion B, the handle W4 can be assembled and the handle W4 can be mounted on the vehicle. When the airbag device 105 is attached, the sensor layer 83 and the grip detection circuit 100 capable of detecting the grip of the driver are connected by a predetermined lead wire.

In the handle W4 mounted on the vehicle, if the hand of the driver approaches the sensor layer 83 of the gripping portion R4 so as to grip the gripping portion R4, since the predetermined grip detection circuit 100 detects that the capacitance has increased, the grip detection circuit 100 can detect the grip of the driver.

Even in the handle W4 of the fourth embodiment, since the sensor layer 83 is disposed at the same time when the covering layer 80 is formed, the handle W4 having the gripping portion R4 having the sensor layer 83 can be easily manufactured as compared with a case where the sheet material provided with the sensor layer is separately wound around the covering layer 80. That is, the sensor layer 83 is a mold coat layer 84 (in-mold coat layer). Therefore, the mold coat agent 96 formed of the urethane-based paint containing the conductive material is applied in advance to the die surfaces 91a and 92a of the molding die 90 when the covering layer 80 is die-molded. After that, the covering layer 80 provided with the sensor layer 83 can be easily formed only by simply molding the covering layer 80. Furthermore, since the sensor layer 83 is the urethane-based paint of the same type as the covering layer 80 formed of urethane foam, the meltability (adhesiveness) to the covering layer 80 is also good, and the sensor layer 83 is unlikely to be displaced with respect to the covering layer 80. Further, since the sensor layer 83 of the handle W4 is provided with the protective layer 86 on the surface thereof and is not directly exposed on the surface side of the gripping portion R4, the grip detection of the gripping portion R4 can be performed with good durability.

Further, in the fourth embodiment, since the sensor layer 83 is covered with the skin material 87 formed of thin leather and disposed on the outer surface side of the gripping portion R4, the sensitivity of the grip detection can be improved. Further, the protective layer 86 that covers the sensor layer 83 on the surface side of the gripping portion R4 is the skin material 87 that is attached to the sensor layer 83. Therefore, the gripping portion 4 can be improved in design by the design of the skin material 87.

Figure 19:
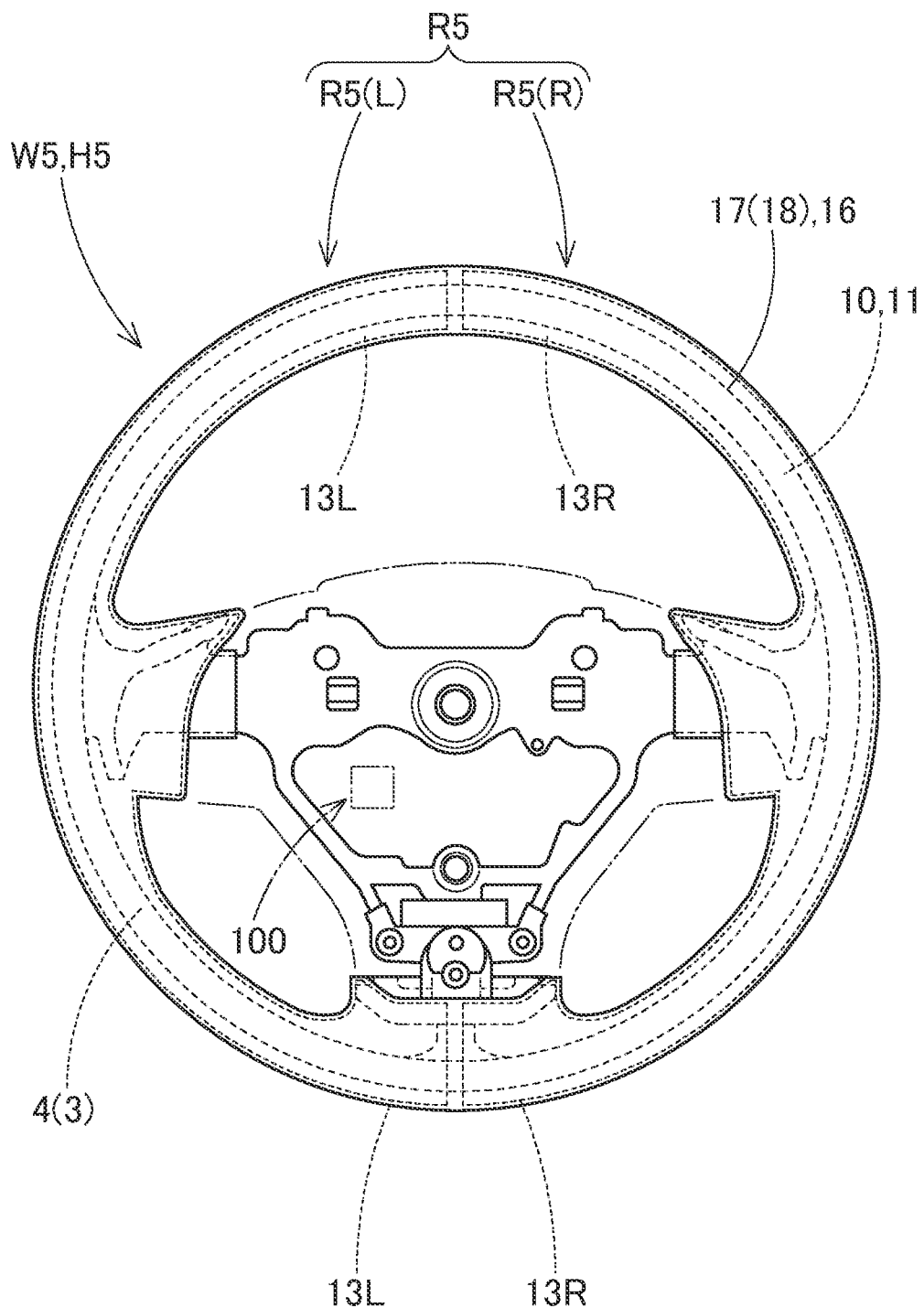
FIG. 19 is a schematic plan view showing a handle of another modified example of the first embodiment.

In each embodiment, the single sensor layers 13, 33, and 57 are disposed on the gripping portions R1, R2, and R3. However, as in a gripping portion R5 of a handle W5 shown in FIG. 19, the sensor layer 13 of the first embodiment may be formed from the sensor layers 13L and 13R separated on the left and right. In the gripping portion R5, the grip can be detected separately in a left side area R5L of the sensor layer 13L and a right side area R5R of the sensor layer 13R.

Figure 20:
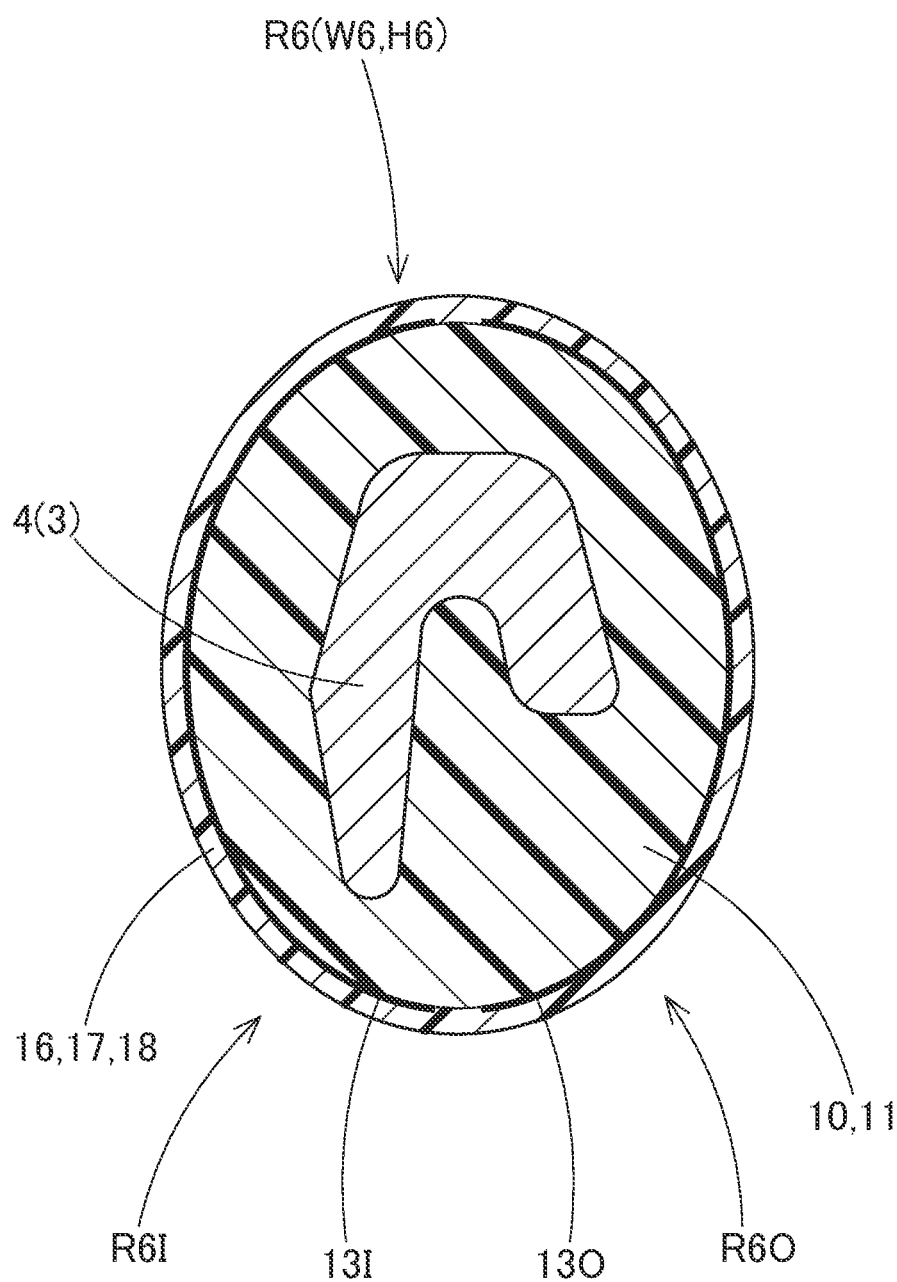
FIG. 20 is a schematic sectional view showing a handle of still another modified example of the first embodiment.

Further, in a case where the sensor layer 13 is divided, a gripping portion R6 of a handle W6 shown in FIG. 20 can be exemplified. The gripping portion R6 is a sensor layer 13I and a sensor layer 130 in which the sensor layer 13 is separated on an inner peripheral side and an outer peripheral side of the gripping portion R6. Therefore, in the gripping portion R6, the grip can be detected separately in an area R6I on the inner peripheral side and an area R6O on the outer peripheral side of the gripping portion R6. In a case where the sensor layer is divided, it can be easily divided only by masking the die surface when applying the mold coat agent.

Further, in the handles W1, W1A, W2, W3, W4, and W5 of each embodiment, the substantially annular gripping portion R1, R1A, R2, R3, R4, and R5 are exemplified. However, the gripping portion is not limited to the annular shape, and may have various shapes such as a square annular shape and an elliptical annular shape.

The handle of the present embodiment is provided with the sensor layer capable of detecting the grip in the gripping portion that is gripped at the time of steering. The gripping portion includes a core material, a covering layer formed of urethane foam, which is disposed by die-molding so as to cover a periphery of the core material, and a sensor layer. The sensor layer is formed of a mold coat agent formed of a urethane-based paint containing a conductive material, and is disposed on a surface side of the covering layer at a time of molding the covering layer. Further, the sensor layer is covered with a protective layer disposed on a surface side of the gripping portion.

In the handle of the present embodiment, the sensor layer is disposed at the same time when the covering layer is formed. Therefore, the handle can be manufactured more easily than that in a case of separately winding the sheet material provided with the sensor layer around the covering layer. That is, the sensor layer is the mold coat layer (in-mold coat layer). Therefore, the mold coat agent formed of the urethane-based paint containing the conductive material is applied in advance to the die surface of the molding die when the covering layer is die-molded. Then, after coating, the covering layer provided with the sensor layer can be formed only by molding the covering layer. Further, in the comparative example in which the sensor layer is not the mold coat layer, for example, the urethane-based paint forming the sensor layer that is applied to the outer surface side of the covering layer after molding, and cured to form the sensor layer can be exemplified. However, in this comparative example, a process of applying a primer to the outer surface of the covering layer after molding or a drying process after applying the urethane-based paint is required. On the other hand, the handle of the present embodiment can be easily manufactured because the above-mentioned primer applying process and drying process are not required. Furthermore, the sensor layer is the urethane-based paint of the same type as the covering layer formed of urethane foam. Therefore, the sensor layer and the covering layer can have good mutual meltability (adhesiveness), and the sensor layer is unlikely to be displaced with respect to the covering layer. Further, the sensor layer of the present embodiment is provided with the protective layer on the surface thereof. Therefore, since the handle of the present embodiment is not directly exposed on the surface side of the gripping portion, the grip detection of the gripping portion can be performed with good durability.

Therefore, the handle of the present embodiment can be easily manufactured even if the gripping portion includes the sensor layer for detecting the grip.

The handle of the present embodiment can be formed from the skin layer formed of urethane foam, in which the protective layer is disposed by die-molding. This handle is configured to include the first urethane layer as the covering layer on the core material side on the back surface side of the sensor layer, and the second urethane layer as the skin layer on the surface side of the sensor layer.

In such a configuration, the skin layer as the protective layer is configured as the second urethane layer, and can be configured with elasticity. Therefore, in this handle, it is possible to improve the feeling when gripping the gripping portion. Further, if a predetermined pigment is added to the urethane foam material of the second urethane layer, the skin layer can be formed as a predetermined color scheme, and the design of the handle can be improved.

In this case, it is desirable that the second urethane layer has a density higher than that of the first urethane layer.

In such a configuration, if the density of the second urethane layer on the outer surface side of the sensor layer is higher than the density of the first urethane layer on the inner peripheral side of the sensor layer, the dielectric constant of the second urethane layer is improved as compared with that of the first urethane layer. Therefore, the parasitic capacitance generated between the sensor layer and the core material can be suppressed, and the sensitivity of the grip detection of the sensor layer can be improved. As a result, in this handle, the accuracy of the grip detection can be improved.

Further, in the handle in which the first urethane layer and the second urethane layer are disposed with the sensor layer therebetween, a fitting portion in which the first urethane layer and the second urethane layer are fitted to each other may be provided with the sensor layer therebetween so that the displacement of the second urethane layer with respect to the first urethane layer can be suppressed.

Further, in the handle of the present embodiment, the protective layer may be disposed as the top coat layer formed of the urethane-based paint. In this handle, the urethane-based paint of the top coat layer is used as the first mold coat agent, and the mold coat agent forming the sensor layer is used as the second mold coat agent. Then, if the first mold coat agent and the second mold coat agent are sequentially applied to the die surface of the molding die of the covering layer, the sensor layer formed of the second mold coat agent and the protective layer formed of the first mold coat agent are disposed on the surface side of the covering layer at the time of molding the covering layer.

In such a configuration, if the first mold coat agent and the second mold coat agent are sequentially applied to the die surface of the molding die of the covering layer to mold the covering layer, the sensor layer and the top coat layer as the protective layer for protecting the sensor layer can be formed at the same time. Therefore, in this handle, it is possible to more easily form the gripping portion having durability of the sensor layer. Further, the sensor layer is covered with the top coat layer and is disposed on the outer surface side of the gripping portion. Therefore, in this handle, the sensitivity of grip detection can be improved.

Further, in the handle of the present embodiment, the protective layer may be disposed as the skin material to be attached to the outer surface of the sensor layer. Further, the covering layer formed of urethane foam is configured of the first urethane layer on the core material side, the second urethane layer on the back surface side of the sensor layer, and the shield layer disposed between the first urethane layer and the second urethane layer. Further, the shield layer is configured of the first mold coat agent formed of the urethane-based paint containing the conductive material, and the sensor layer is configured of the second mold coat agent. Then, if the first mold coat agent is applied to the die surface of the molding die of the first urethane layer, the shield layer formed of the first mold coat agent is disposed on the surface side of the first urethane layer at the time of molding the first urethane layer. Further, if the second mold coat agent is applied to the die surface of the molding die of the second urethane layer, the sensor layer formed of the second mold coat agent is disposed on the surface side of the second urethane layer at the time of molding the second urethane layer.

In such a handle, the first mold coat layer formed of the first mold coat agent containing the conductive material is disposed as the shield layer on the core material side of the sensor layer. Therefore, in this handle, it is possible to suppress the influence of the parasitic capacitance on the core material side and improve the sensitivity of the grip detection in the sensor layer. Of course, the protective layer covering the sensor layer on the surface side of the gripping portion is used as the skin material to be attached to the sensor layer. Therefore, in this handle, the design of the gripping portion can be improved by the design of the skin material.

Further, as the handle, the protective layer may be formed of the skin material attached to the outer surface of the sensor layer. In such a handle, the gripping portion can be configured of the core material, the covering layer formed of urethane foam disposed by die-molding to cover the periphery of the core material, the sensor layer, and the skin material as the protective layer for protecting the sensor layer.

What is claimed is:

1. A handle in which a sensor layer capable of detecting grip is disposed on a gripping portion that is gripped at a time of steering,
    wherein the gripping portion includes
        a core material,
        a covering layer formed of urethane foam, which is disposed by die-molding to cover a periphery of the core material, and
        the sensor layer, and
    the sensor layer
        is formed of a mold coat agent formed of a urethane-based paint containing a conductive material,
        is disposed on a surface side of the covering layer at a time of molding the covering layer, and
        is covered with a protective layer disposed on a surface side of the gripping portion, wherein
    the protective layer is formed of a skin layer that is formed of urethane foam, which is disposed by die-molding,
    the handle includes
        a first urethane layer as the covering layer on a core material side on a back surface side of the sensor layer, and
        a second urethane layer as the skin layer on a surface side of the sensor layer, and
    the first urethane layer and the second urethane layer have fitting portions which are fitted to each other with the sensor layer therebetween so that a displacement of the second urethane layer with respect to the first urethane layer is suppressed.

2. The handle according to claim 1, wherein the second urethane layer has a density higher than that of the first urethane layer.

* * * * *